United States Patent
Ohmstede et al.

(10) Patent No.: US 9,802,850 B2
(45) Date of Patent: Oct. 31, 2017

(54) ENERGY EFFICIENT HIGH-TEMPERATURE REFINING

(75) Inventors: Volker Ohmstede, Bingen (DE);
Wolfgang Muench, Budenheim (DE);
Stefan Bauer, Hueffelsheim (DE);
Holger Hunnius, Mainz (DE); Guenter Weidmann, Flonheim (DE)

(73) Assignee: SCHOTT AG, Mainz (DE)

( * ) Notice: Subject to any disclaimer, the term of this patent is extended or adjusted under 35 U.S.C. 154(b) by 1235 days.

(21) Appl. No.: 13/879,590

(22) PCT Filed: Oct. 13, 2011

(86) PCT No.: PCT/EP2011/004751
§ 371 (c)(1),
(2), (4) Date: Jul. 8, 2013

(87) PCT Pub. No.: WO2012/048790
PCT Pub. Date: Apr. 19, 2012

(65) Prior Publication Data
US 2013/0279532 A1 Oct. 24, 2013

(30) Foreign Application Priority Data

Oct. 14, 2010 (DE) .................. 10 2010 048 297

(51) Int. Cl.
*C03B 5/027* (2006.01)
*C03B 5/185* (2006.01)
(Continued)

(52) U.S. Cl.
CPC ............ *C03B 5/185* (2013.01); *C03B 5/04* (2013.01); *C03B 5/08* (2013.01); *C03B 5/1672* (2013.01);
(Continued)

(58) Field of Classification Search
CPC ... C03B 5/0334; C03B 5/033602; C03B 5/04; C03B 5/1672; C03B 5/185; C03B 5/225;
(Continued)

(56) References Cited

U.S. PATENT DOCUMENTS 2,286,653 A * 6/1942 Siegfried .............. C03B 37/085
373/29
3,585,268 A * 6/1971 Monks ...................... C03B 5/00
373/27
(Continued)

FOREIGN PATENT DOCUMENTS

| CN | 1720765 A | 1/2006 |
| CN | 1864437 A | 11/2006 |

(Continued)

OTHER PUBLICATIONS

Chinese Office Action dated Oct. 10, 2014 corresponding to Chinese Patent Application No. 201180049503.2 with English translation, 11 pages.

(Continued)

*Primary Examiner* — Hung D Nguyen
(74) *Attorney, Agent, or Firm* — Ohlandt, Greeley, Ruggiero & Perle, L.L.P.

(57) ABSTRACT

An energy-efficient device for refining a glass melt to produce a glass and/or a glass ceramic is provided. The device includes a refining crucible defined at least by lateral walls with a metallic lining as a melt contact surface, so that a melt refining volume is defined by a base surface, a top surface and a circumferential surface; at least one heating device that conductively heats the lining by an electric current in the lining, so that the melt is heated through the lining, the heating device and the lining are connected to one another by a feeding device. The feeding device establishes contact with the lining so that an electric current runs from (Continued)

the top surface to the base surface or from the base surface to the top surface, at least in sections of the lining.

27 Claims, 20 Drawing Sheets

(51) Int. Cl.
   *C03B 5/08* (2006.01)
   *C03B 5/04* (2006.01)
   *C03B 5/167* (2006.01)
   *C03B 5/225* (2006.01)
   *C03B 5/435* (2006.01)

(52) U.S. Cl.
   CPC ............ *C03B 5/1675* (2013.01); *C03B 5/225* (2013.01); *C03B 5/435* (2013.01)

(58) Field of Classification Search
   CPC ..... C03B 5/2252; C03B 5/435; C03B 5/1675; C03B 5/0336; C03B 5/02
   USPC ..... 373/27, 29, 30, 33, 39, 40, 41, 109–137, 373/32, 34, 35; 65/474
   See application file for complete search history.

(56) References Cited

U.S. PATENT DOCUMENTS

| | | | | |
|---|---|---|---|---|
| 3,973,076 A | * | 8/1976 | Scott, Jr. .................. | C22B 9/18 373/75 |
| 4,069,032 A | * | 1/1978 | Brax ........................ | H05B 3/03 373/30 |
| 4,842,628 A | * | 6/1989 | Kreutzer ............. | C03B 37/0146 65/269 |
| 5,131,005 A | * | 7/1992 | Takajo .................. | C03B 5/0334 373/119 |
| 2006/0137402 A1 | * | 6/2006 | Eichholz ................. | C03B 5/027 65/347 |
| 2011/0034316 A1 | * | 2/2011 | Leister ...................... | C03B 5/04 501/94 |

FOREIGN PATENT DOCUMENTS

| | | | |
|---|---|---|---|
| DE | 10253222 | 9/2003 | |
| DE | 102006003521 | 8/2007 | |
| DE | 102006051049 | 7/2008 | |
| JP | 01320231 A | 12/1989 | |
| JP | WO 2010067669 A1 * | 6/2010 | ........... C03B 5/2252 |
| KR | 1020080095241 A | 10/2008 | |
| WO | 2007087856 A1 | 8/2007 | |
| WO | 2010067669 A1 | 6/2010 | |

OTHER PUBLICATIONS

International Search Report dated Dec. 23, 2011 corresponding to International Patent Application No. PCT/EP2011/004751, 2 pages.
English translation of the International Preliminary Report on Patentability dated Apr. 18, 2013 from corresponding International Patent Application No. PCT/EP2011/004751, 8 pages.
Japanese Office Action dated Apr. 16, 2014 corresponding to Japanese Patent App. No. 2013-533108 with English translation, 8 pp.
Korean Office Action dated Jul. 29, 2014 corresponding to Korean Patent Application No. 10-2013-7012436 with English translation, 9 pp.
Written Opinion of the International Searching Authority dated Apr. 18, 2013 from corresponding International Patent Application No. PCT/EP2011/004751, 5 pages.

* cited by examiner

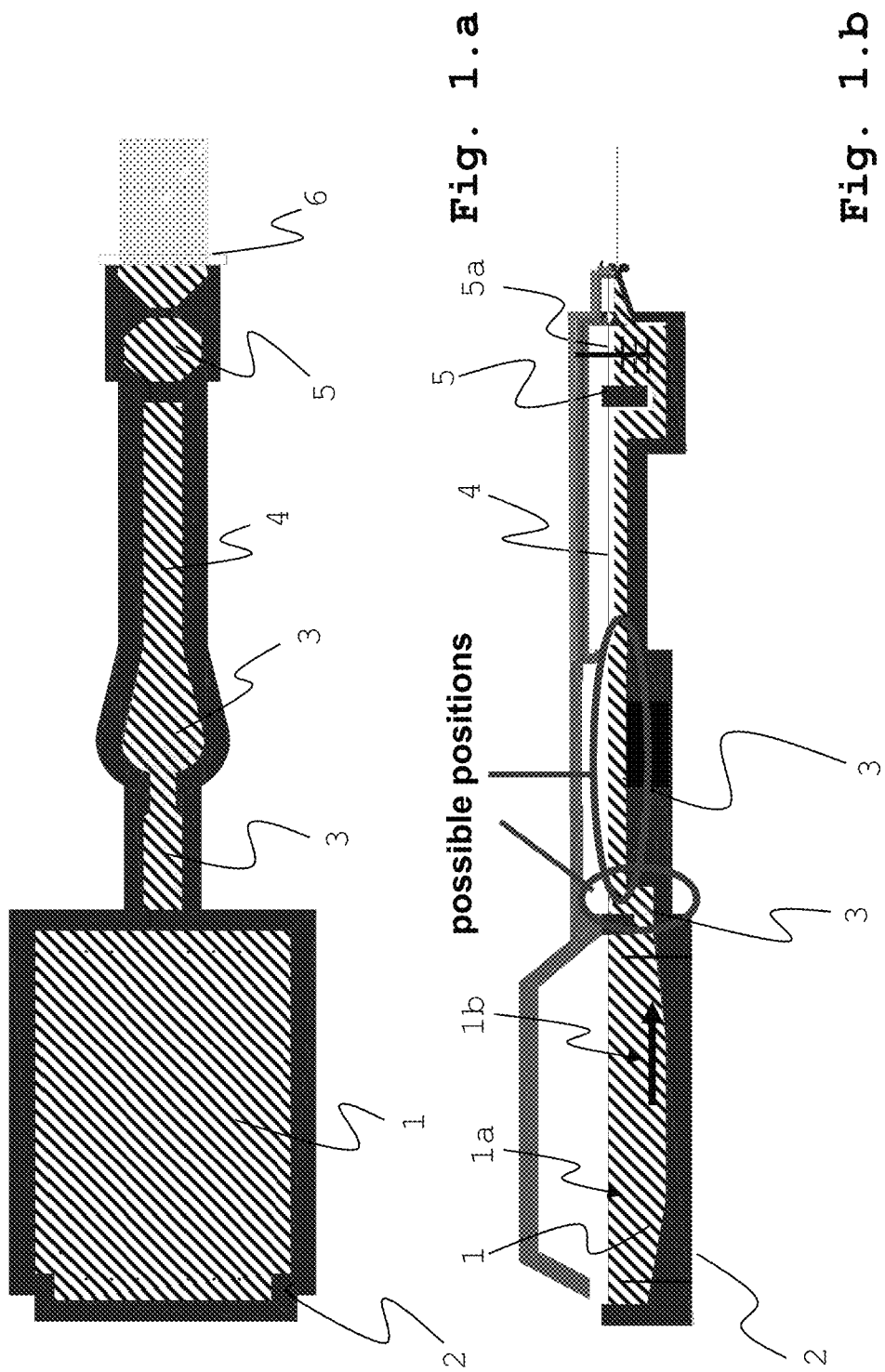

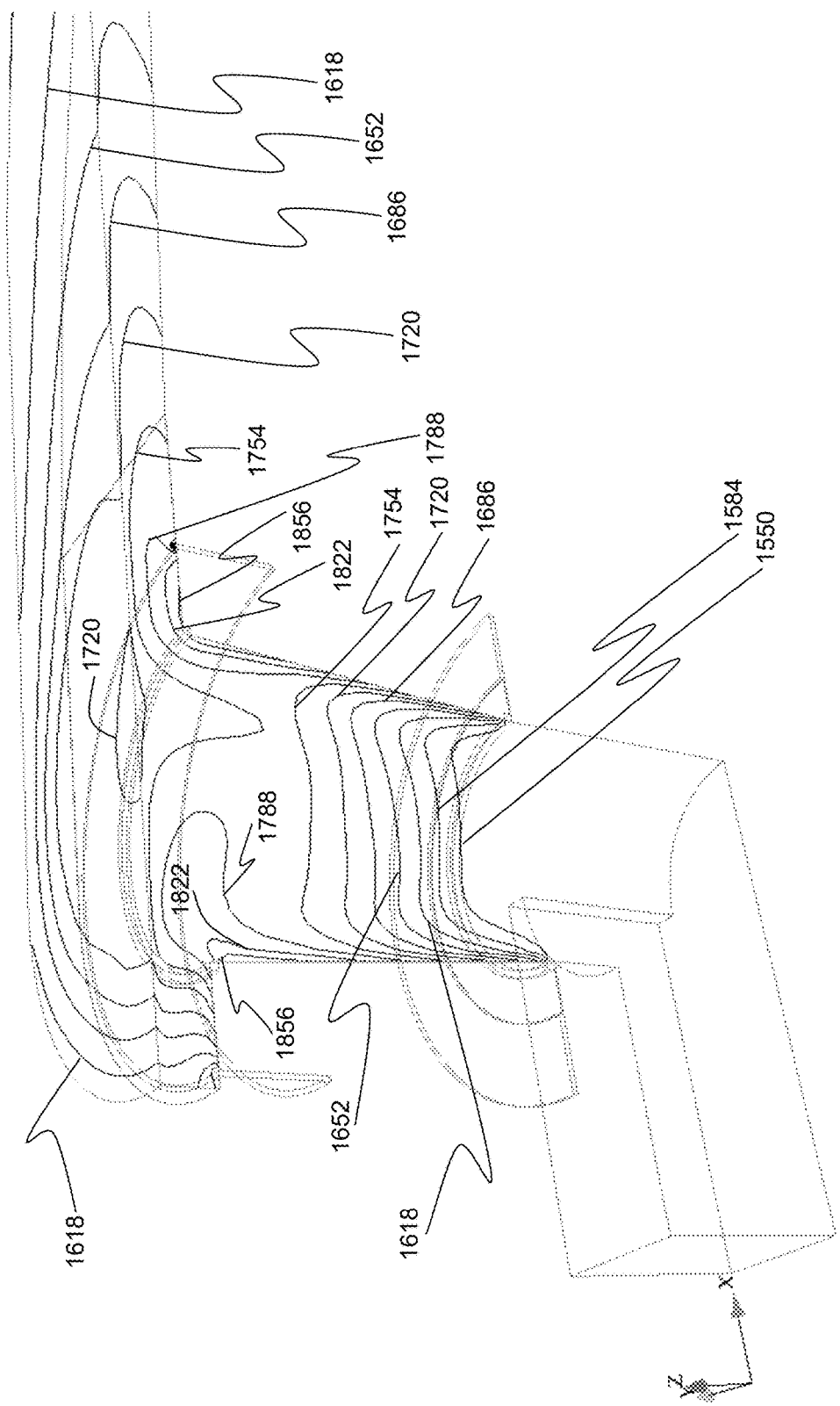
Fig. 2.a

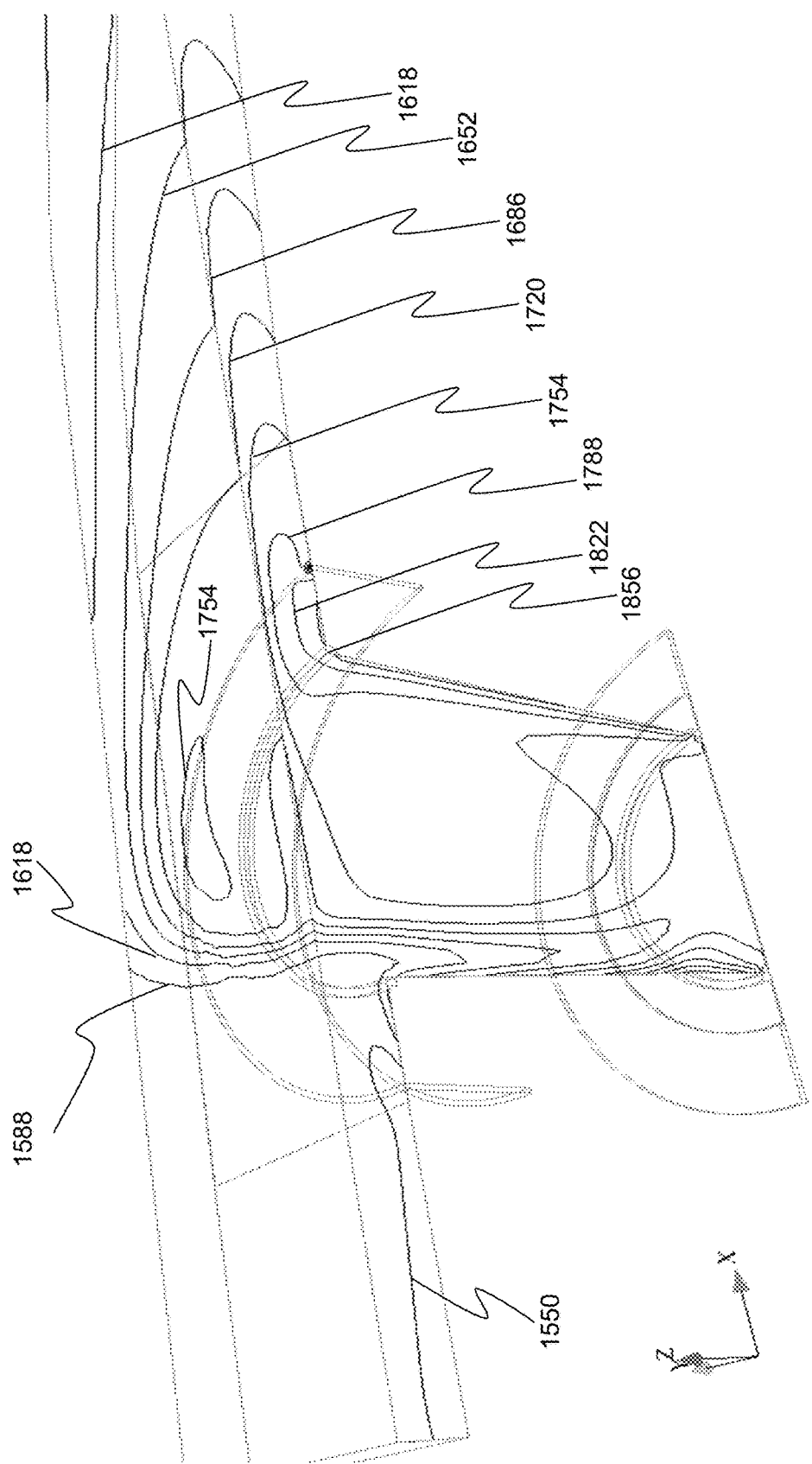
Fig. 2.b

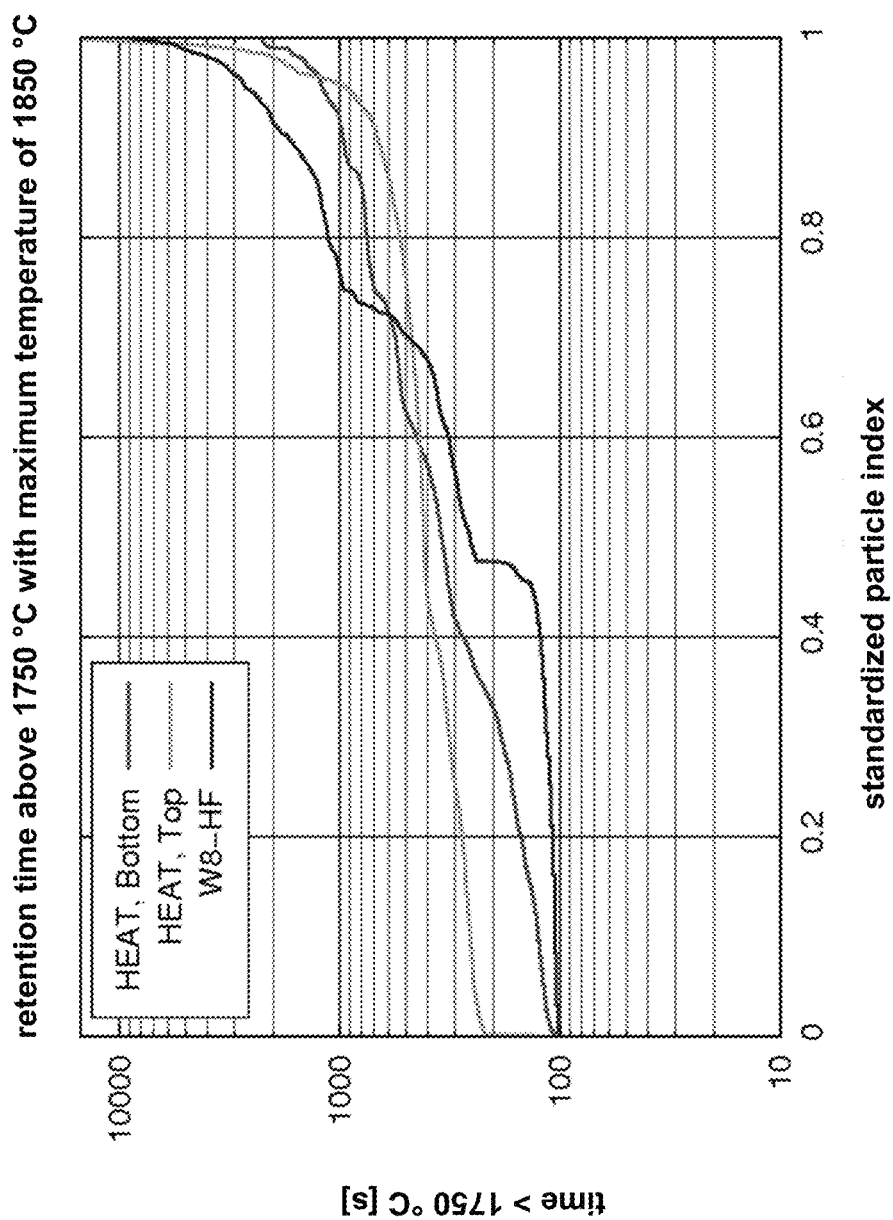
Fig. 2.c

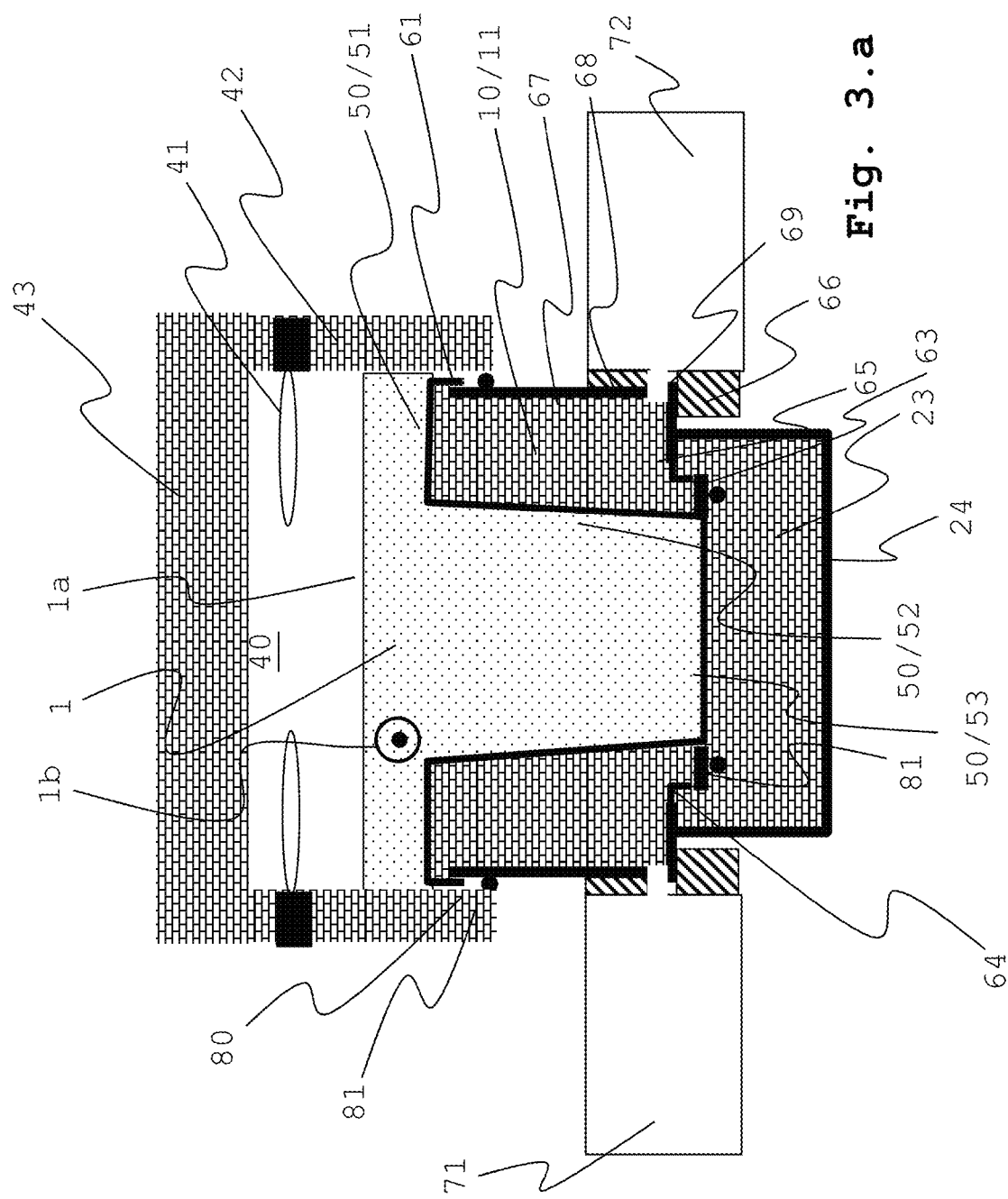
Fig. 3.a

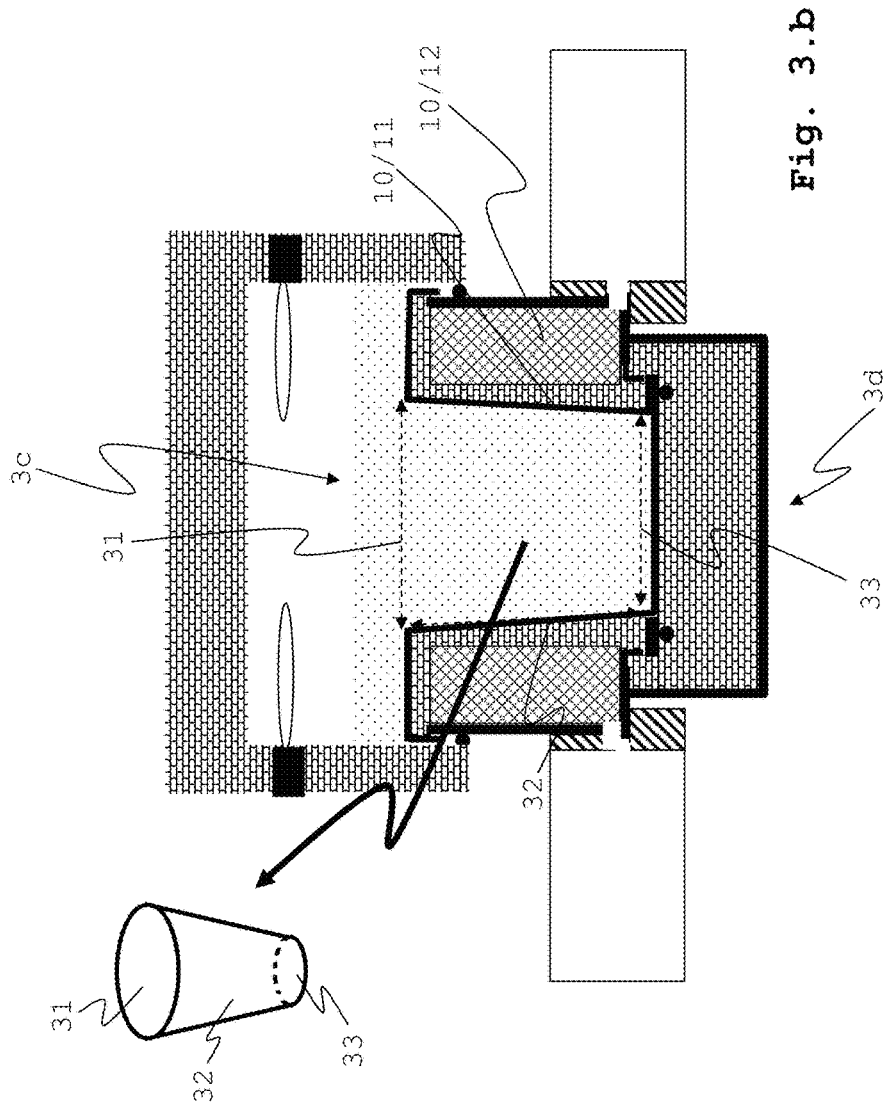

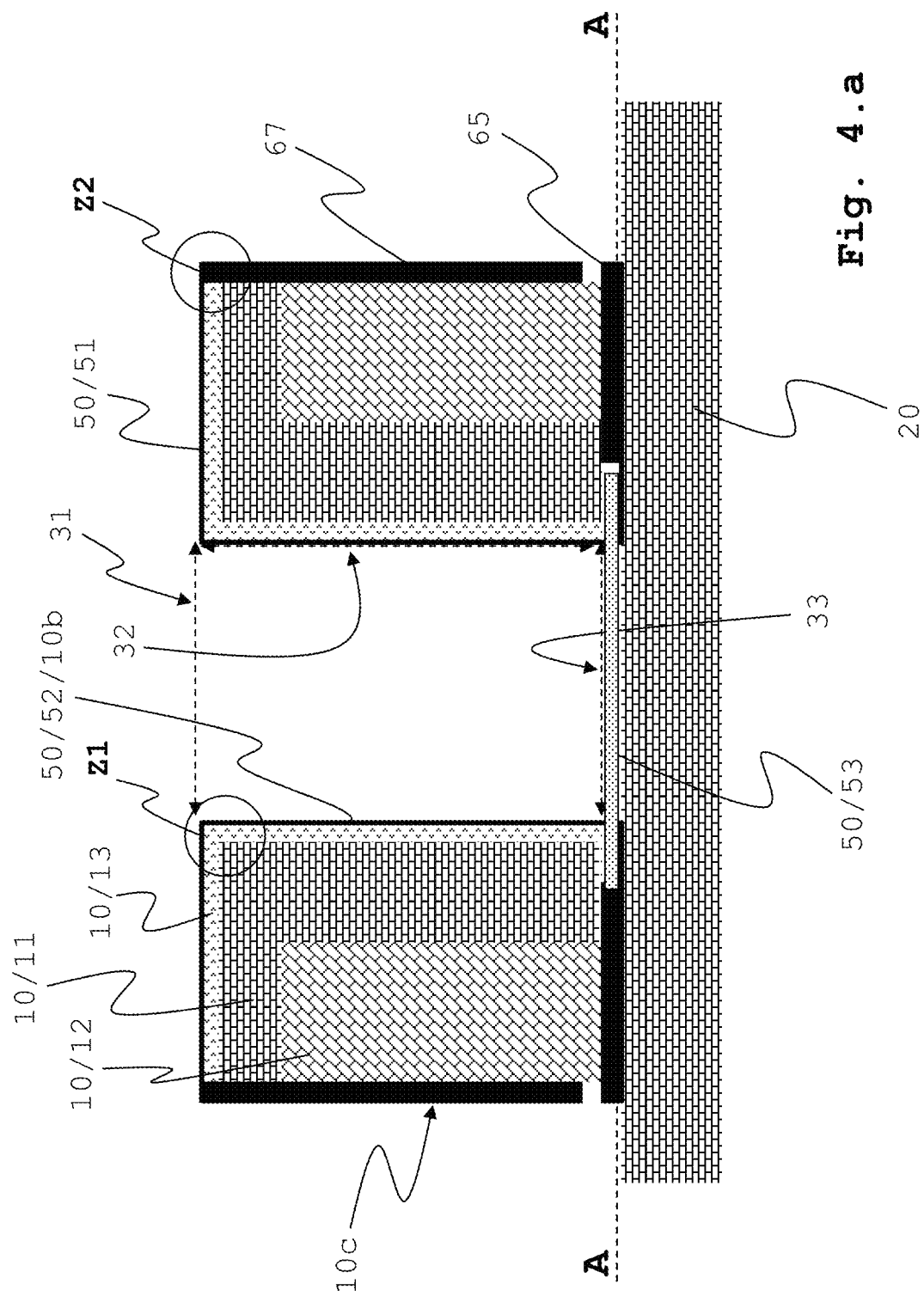

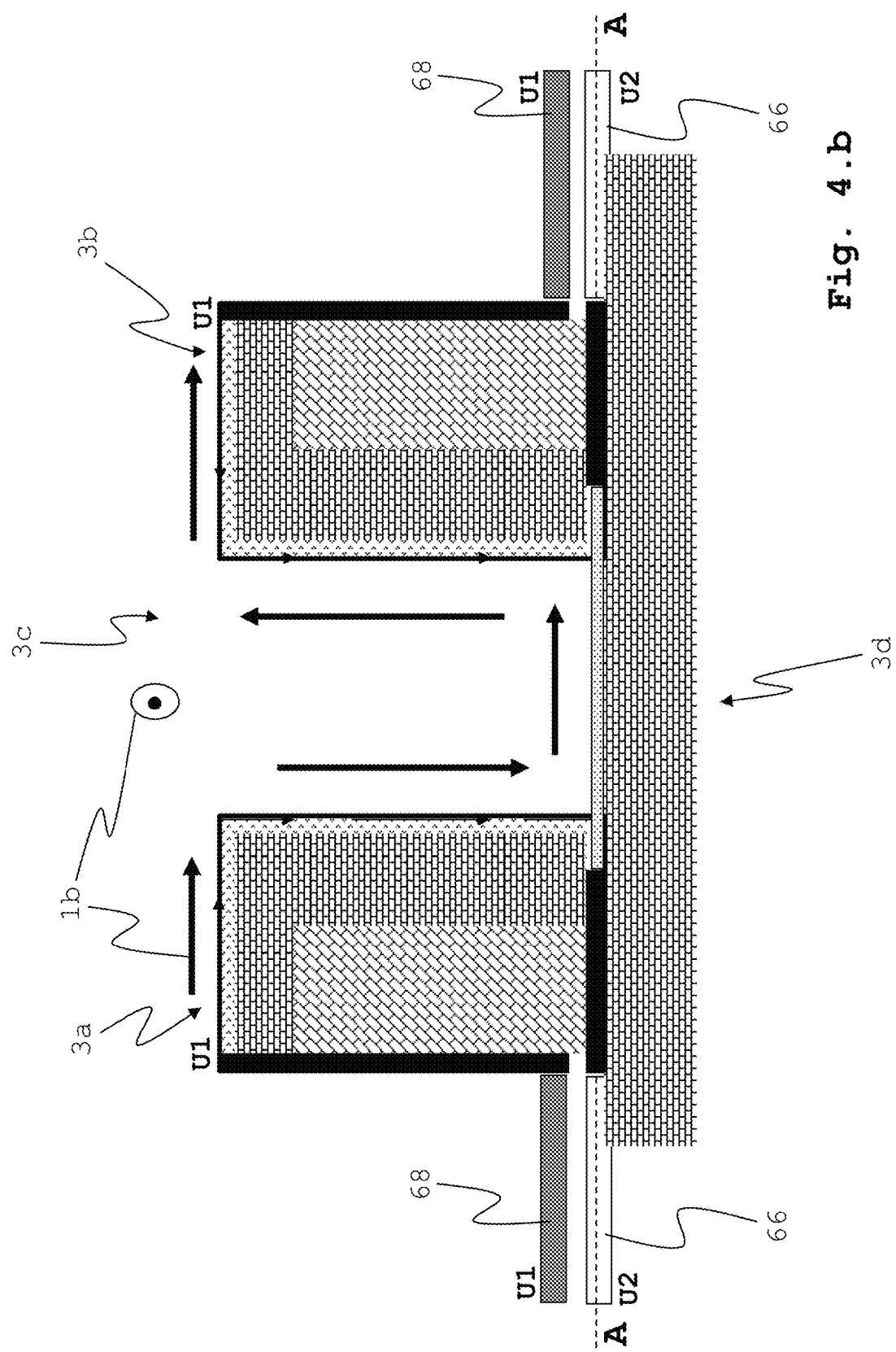
Fig. 4.b

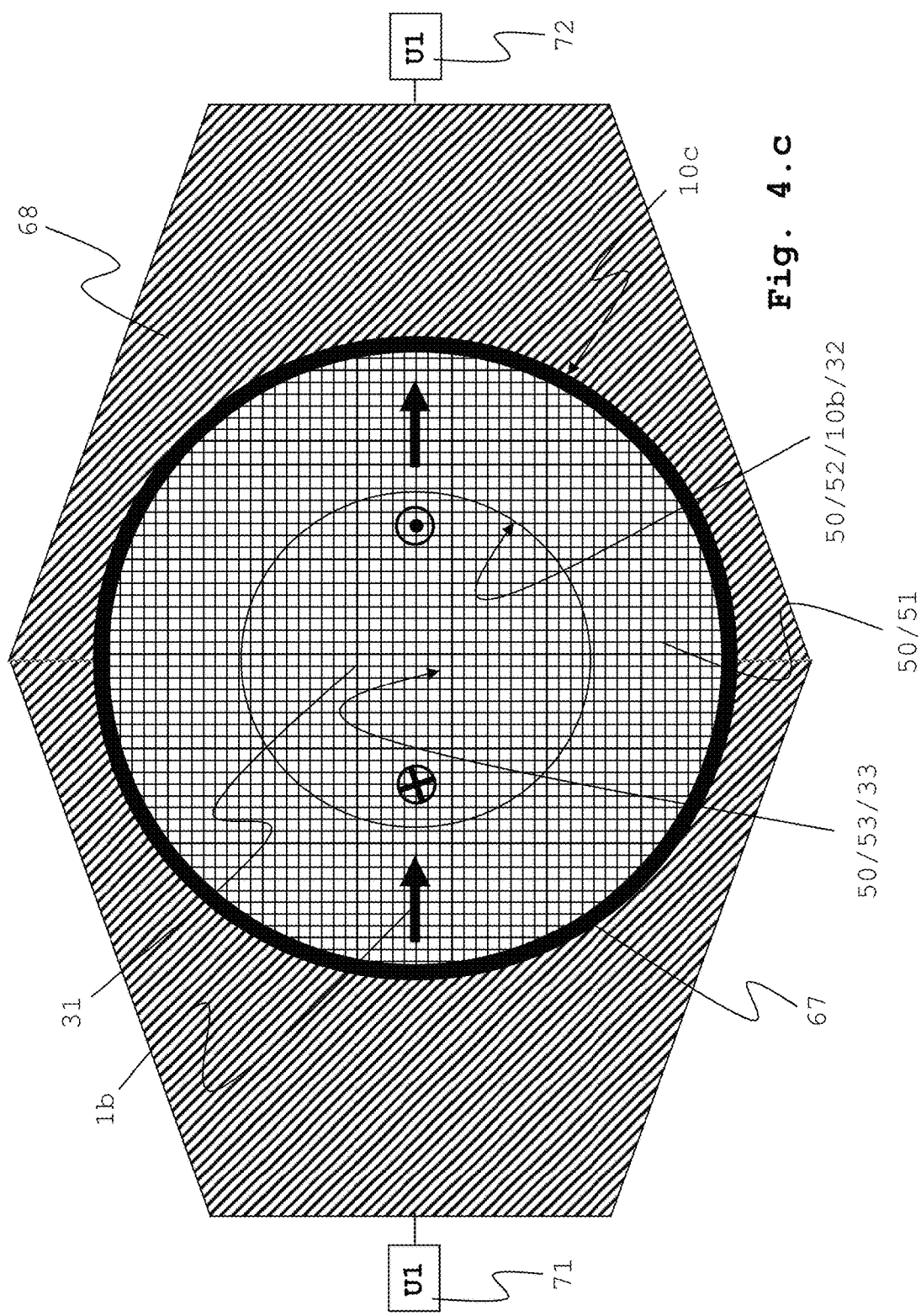
Fig. 4.c

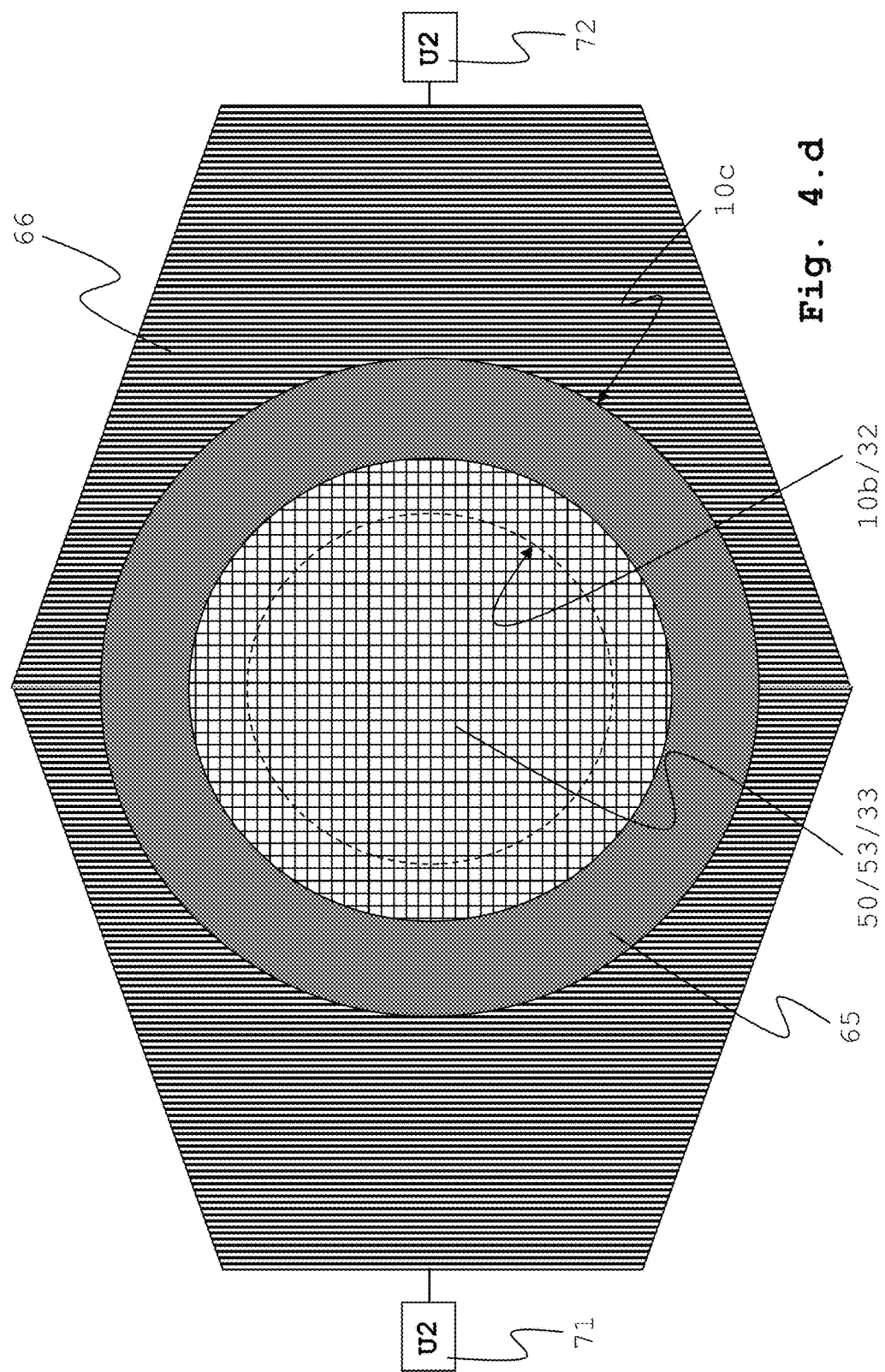

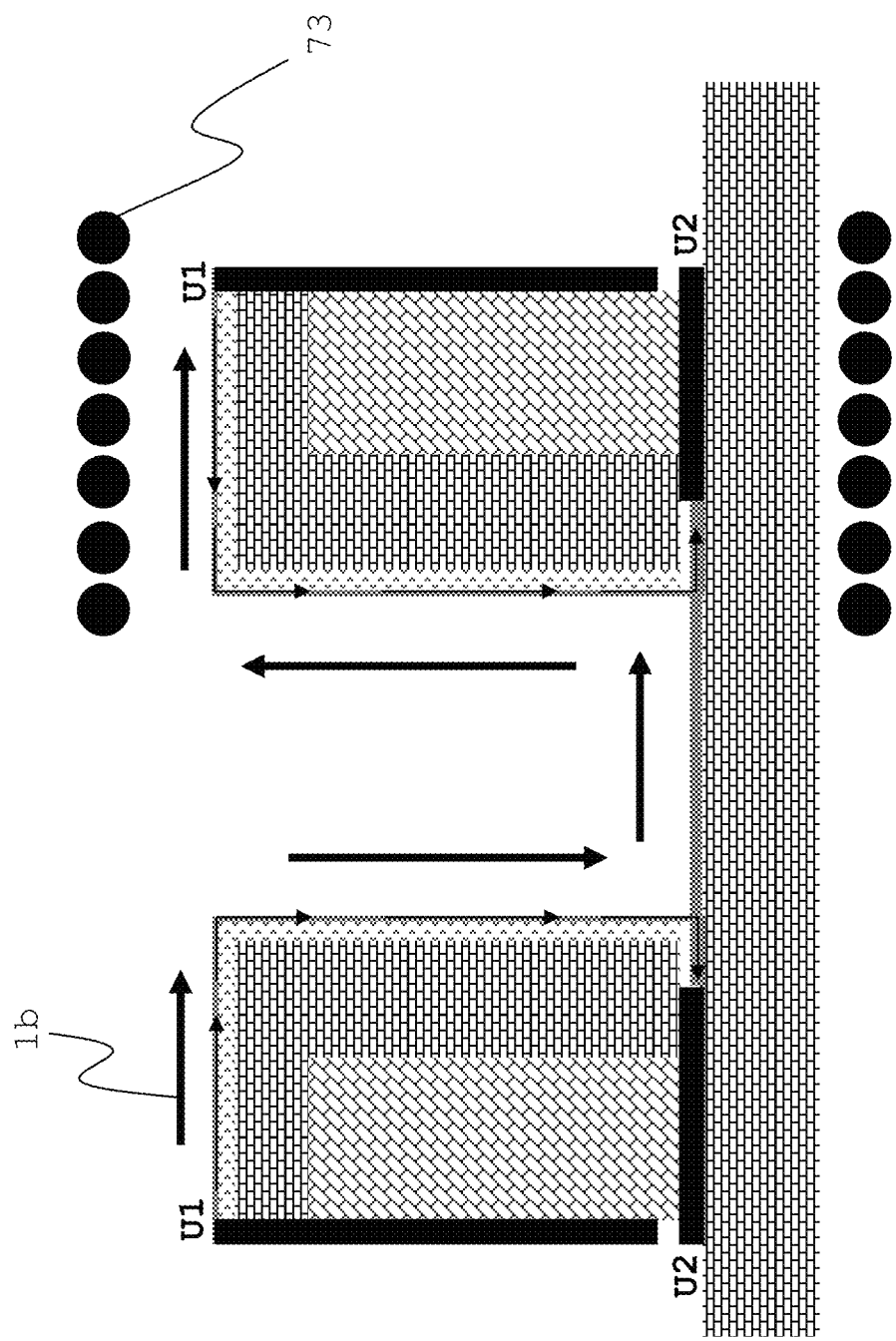

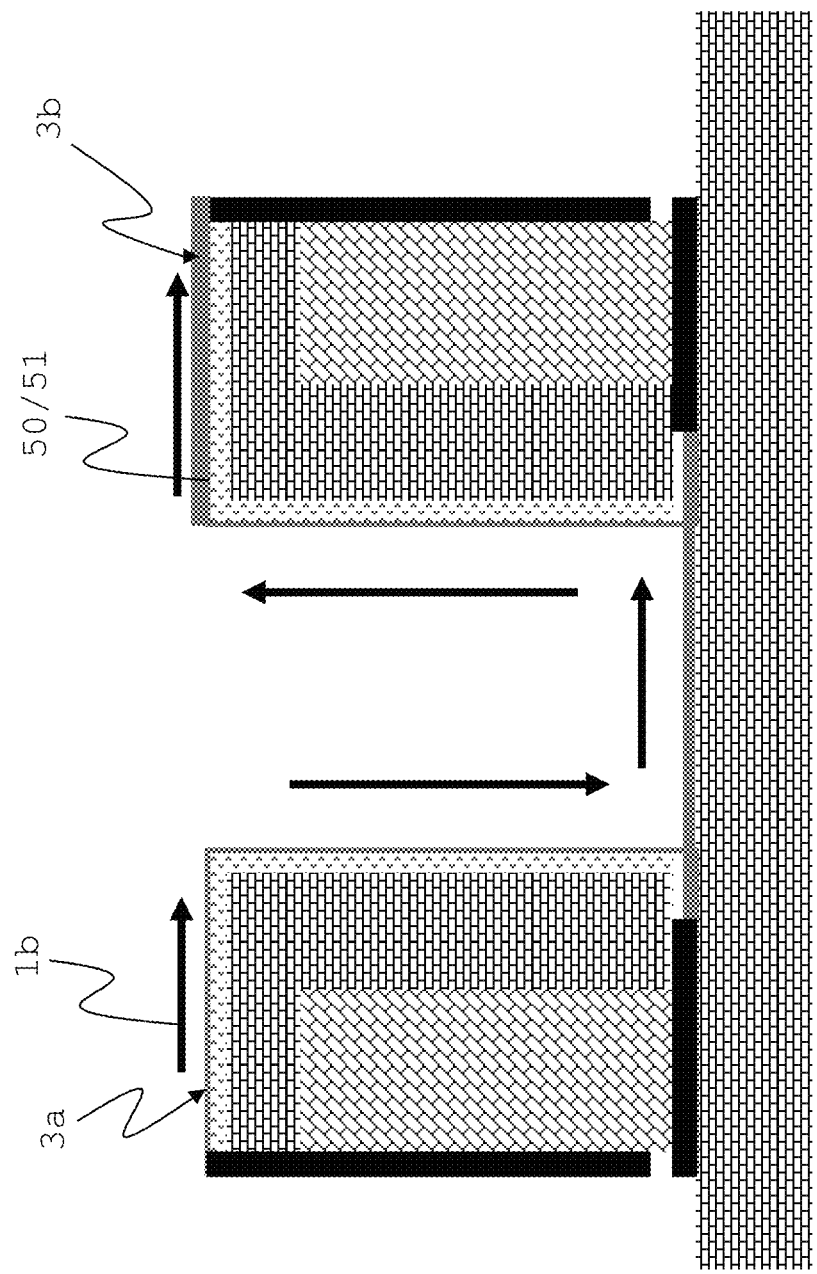
Fig. 5.b

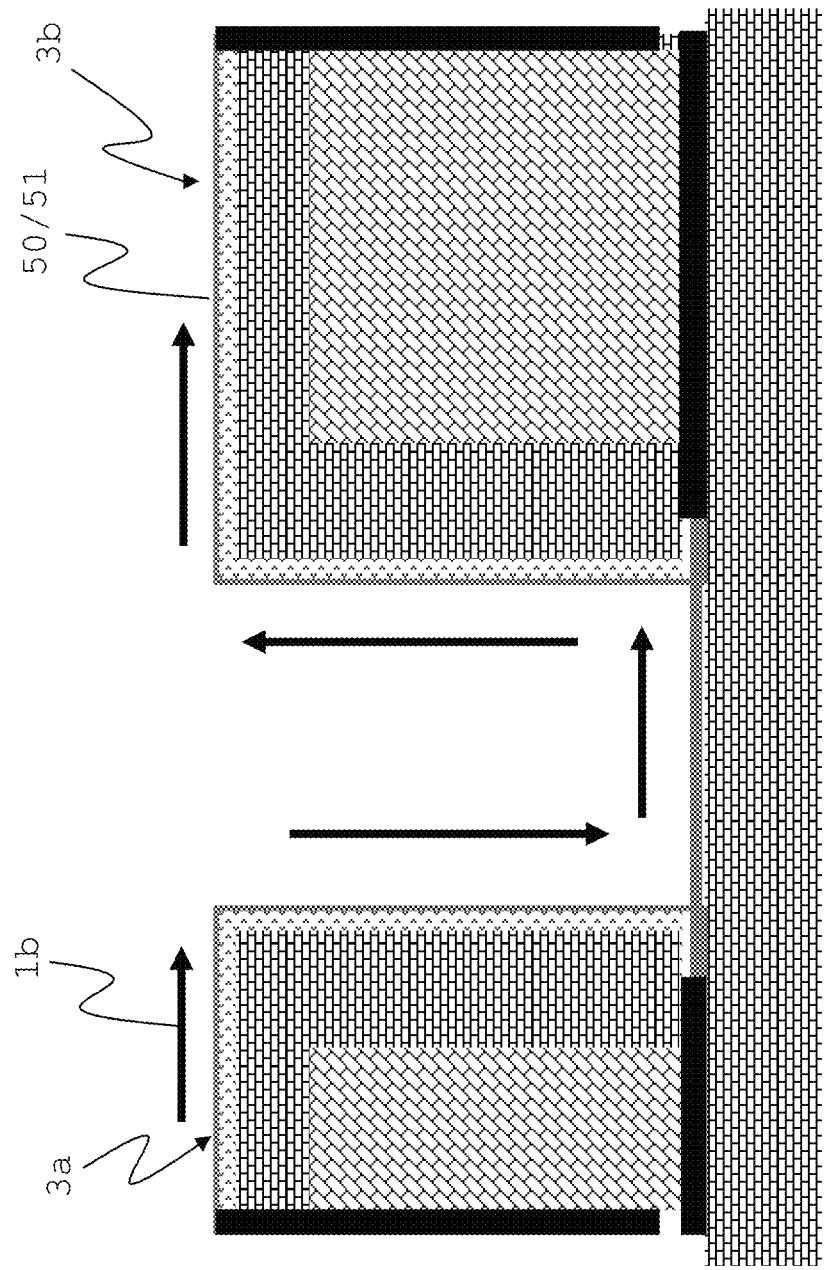
Fig. 5.c

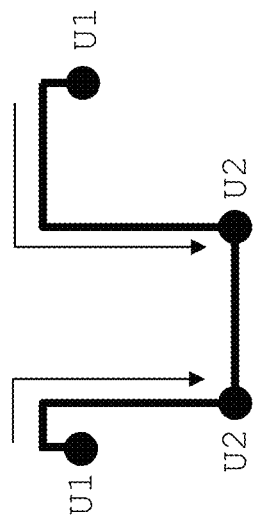
Fig. 6.b
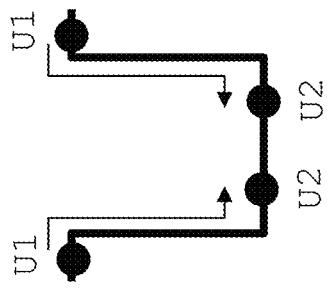
Fig. 6.d
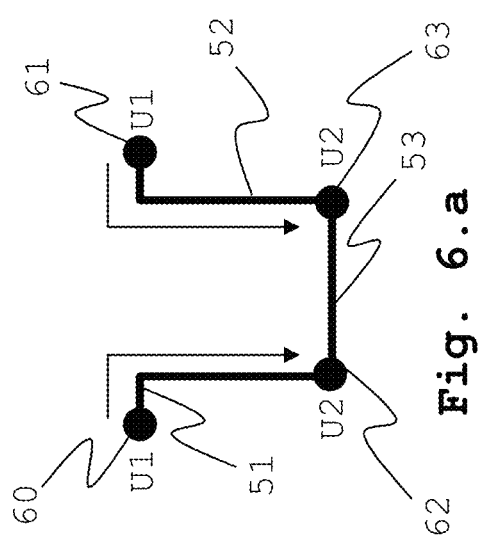
Fig. 6.a
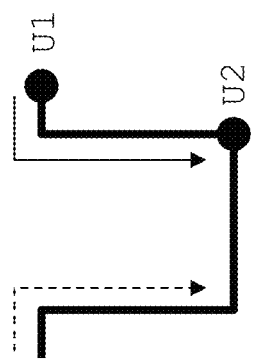
Fig. 6.c

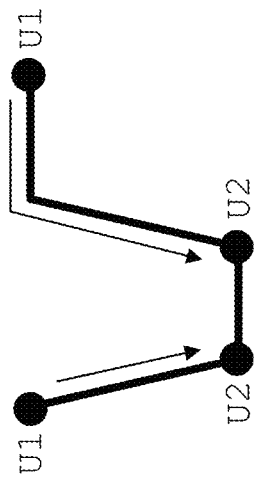
Fig. 6.f
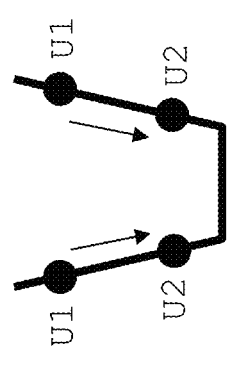
Fig. 6.h
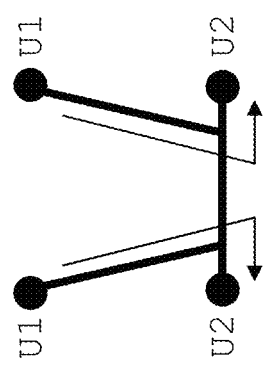
Fig. 6.e
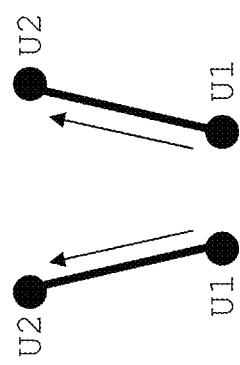
Fig. 6.g

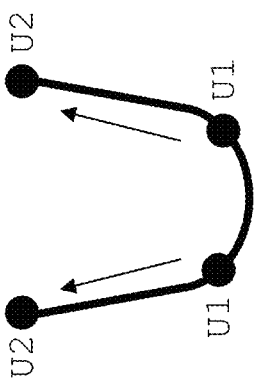
Fig. 6.i
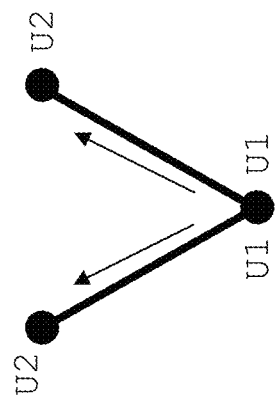
Fig. 6.j
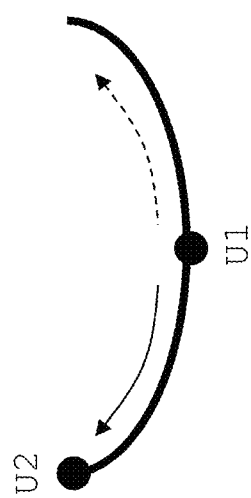
Fig. 6.k
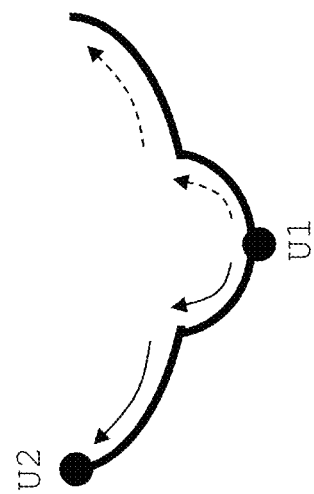
Fig. 6.l

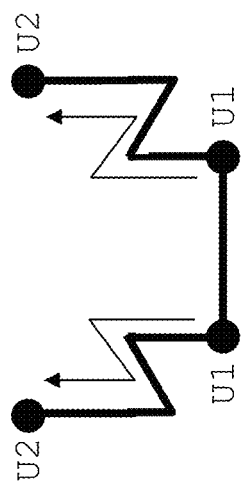
Fig. 6.m
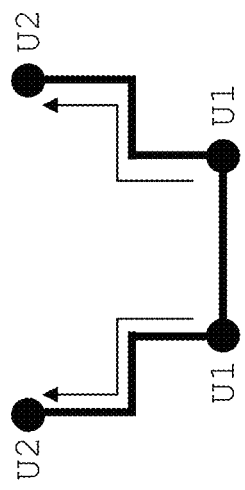
Fig. 6.n
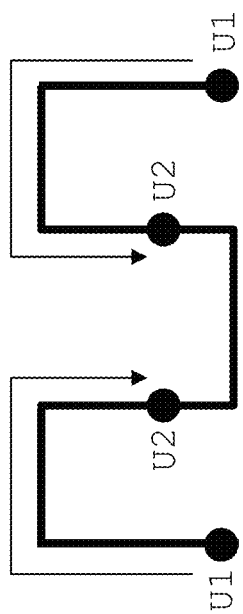
Fig. 6.o

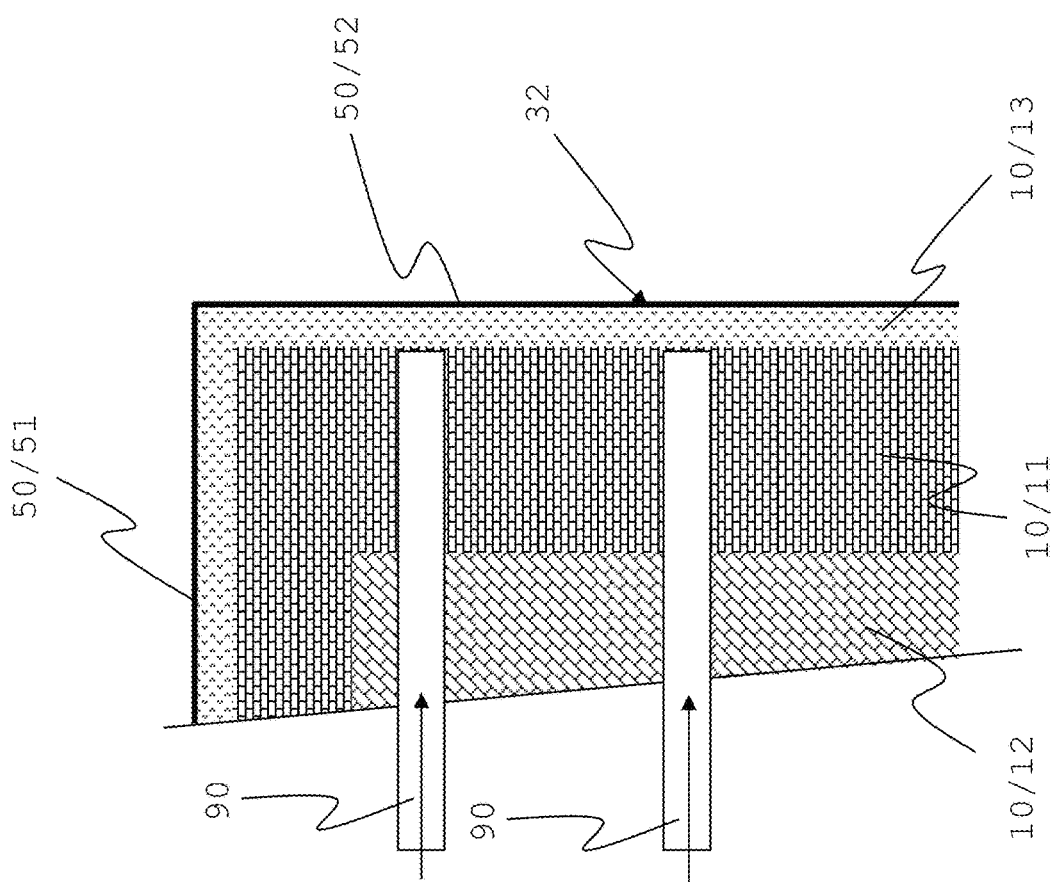

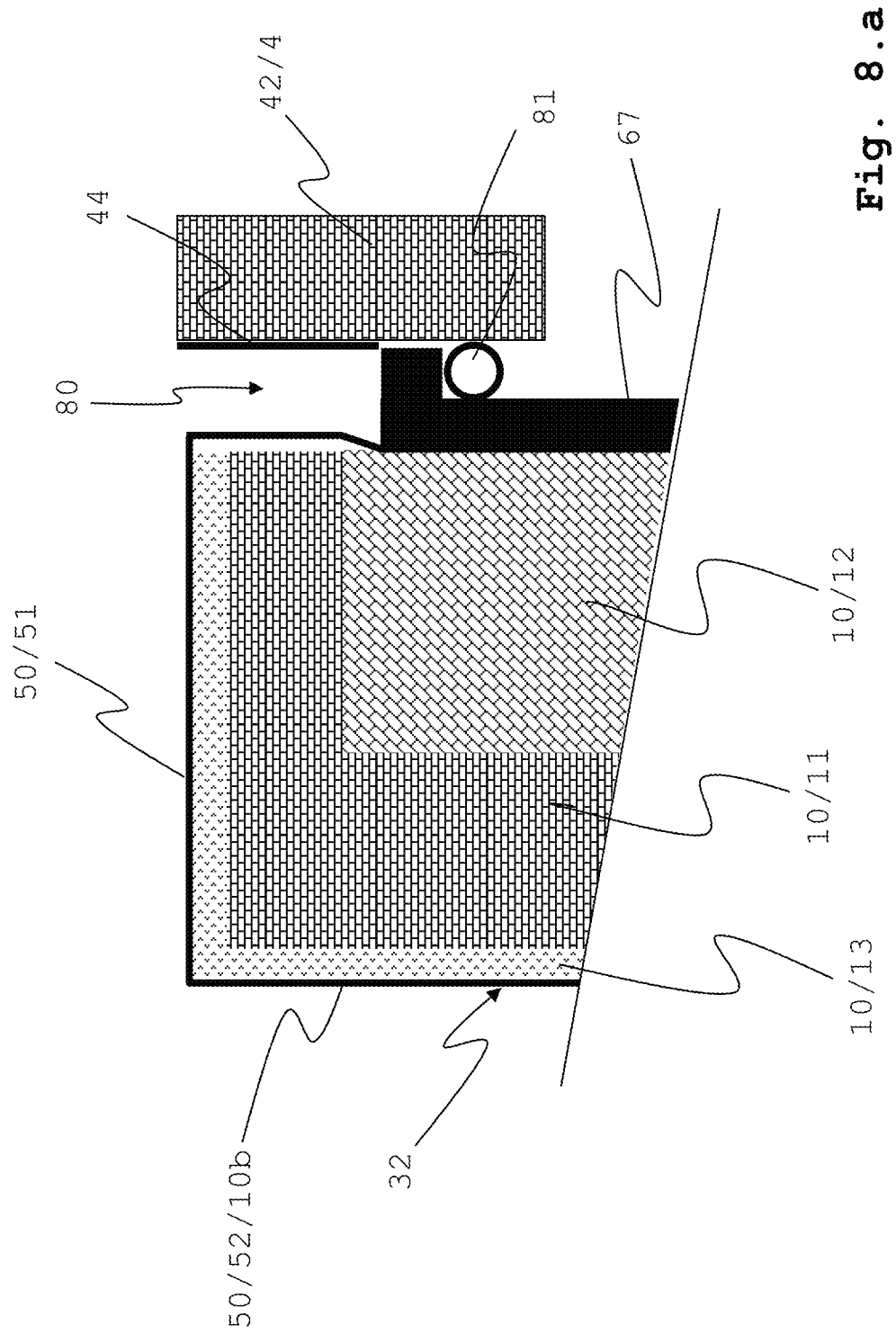

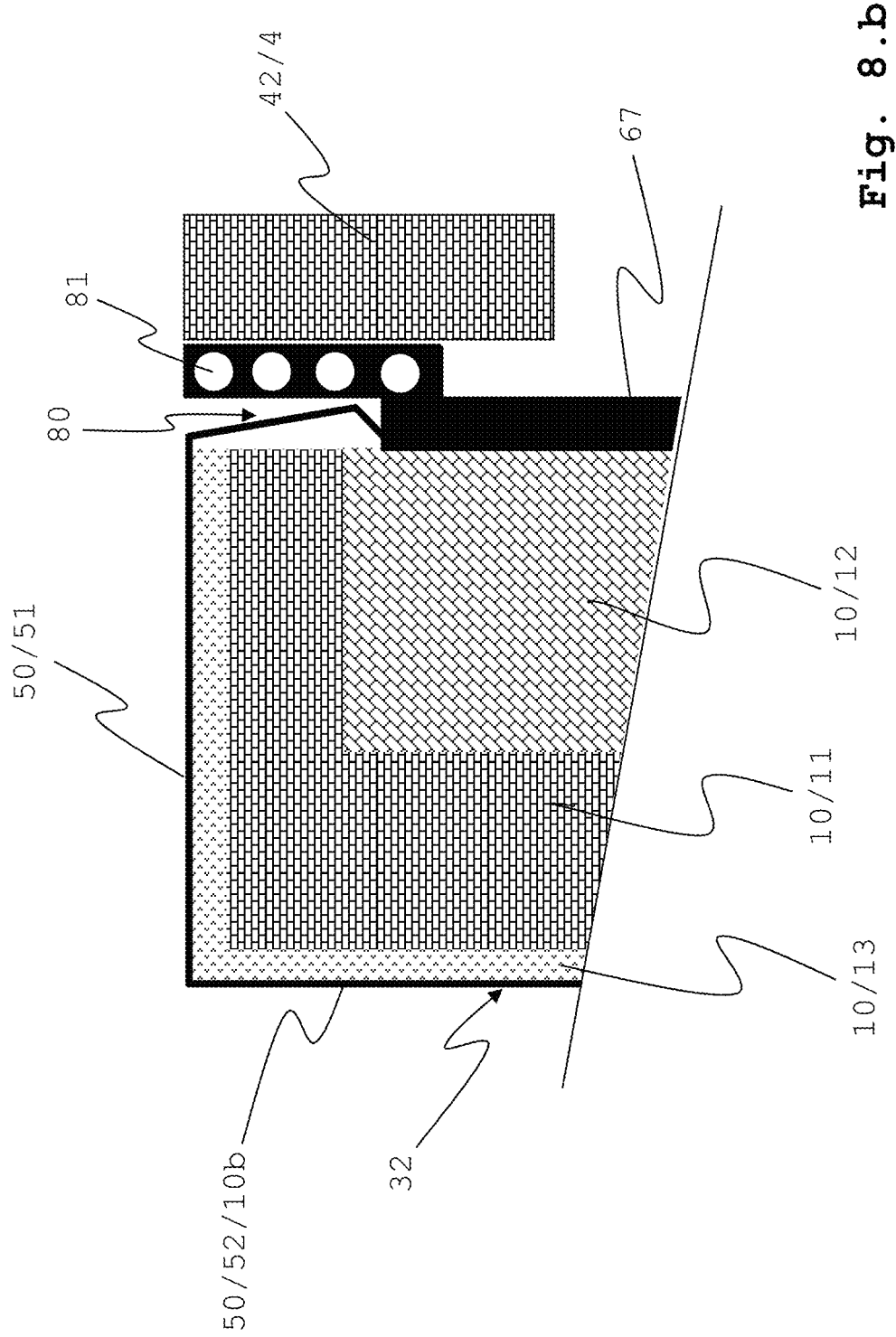
Fig. 8.b

ENERGY EFFICIENT HIGH-TEMPERATURE REFINING

FIELD OF THE INVENTION

The present invention relates to a method and to a device for refining a glass melt.

BACKGROUND OF THE INVENTION

Nowadays, high demands are made on the quality of optical and/or technical glass and/or glass-ceramics. On the one hand these glasses are desired to be as homogeneous as possible and free from bubbles and schlieren. On the other, the glasses are desired to be so called "eco glasses" which should, as far as possible, not contain any toxic or environmentally harmful substances, such as arsenic or antimony.

The quality of the final glass and/or the final glass-ceramic is essentially influenced by the quality of refining the glass melt. One approach to improve the quality of refinement is based on the use of high refining temperatures, since an increase in the refining temperature results in a reduction of the viscosity of the melt and thus in an increase of a rising rate of the bubbles in the melt, so that existing or generated bubbles can be better removed from the melt.

Furthermore, for elevated refining temperatures, in particular of more than 1700° C., so called high-temperature refining agents are available. An example of a high-temperature refining agent is $SnO_2$. $SnO_2$ is ecologically harmless, but can only be used at a refining temperature above 1500° C. This allows to omit ecologically questionable refining agents such as $As_2O_5$ which can already be used at a temperature above 1250° C.

Refinement in a high-temperature range, in particular above 1700° C., is described in document DE 10 2006 003 521 A1, for example. The melt is heated using electrodes which are placed in the melt. However, the teachings described therein do not only aim to increase the temperature. An essential feature therein is a formation of a stabilized convection roll in the refining vessel which is achieved by generating a large temperature difference in the melt. The temperature difference exists between an inner volume zone of the melt and a peripheral zone of the melt. In this manner, the lateral walls of the refining crucible are cooled. They are cooled to such an extent that the melt solidifies on the cooled lateral walls. So a protective layer of intrinsic material is formed. A so-called "skull crucible" is formed. The basic idea of the described teachings is based on the assumption that in order to form a convection roll it is necessary to cool the melt in the peripheral zones through the cooled lateral walls and at the same time to heat the melt in the interior of the refining vessel using the electrodes. The device shown therein is suitable for producing "eco glasses". However, the cooling entails very high energy costs. The energy introduced into the melt for heating the melt is "directly" withdrawn from the melt through the cooled lateral walls. Additionally, the power supplies have to be dimensioned appropriately to be able to provide the required electric power. Also, sufficient cooling for the lateral wall has to be provided. Since the cooling of the lateral walls is based on water-carrying copper pipes, the cooling must not fail under any circumstances because this would result in a collapse of the entire system. Therefore, appropriate emergency cooling systems have to be provided, which involves additional complexity and costs.

GENERAL DESCRIPTION OF THE INVENTION

Given the aforementioned background, an object of the present invention is to provide a method and an device for producing glass and/or glass-ceramics and/or for refining a glass melt, in which the disadvantages of the prior art are at least mitigated.

In particular it is intended to reduce the financial costs of building and operating a refinement system. Preferably, it is intended to reduce the energy demand for refining. However, the good quality of the glasses such as obtained with the above-described system should at least be achieved. In addition, it should be possible to produce "eco glasses".

These objects are already achieved by an device and a method according to the independent claims. Advantageous embodiments of the method and device according to the invention are set forth in the respective dependent claims.

Generally, the invention suggests to replace the described prior art skull walls by "hot", temperature stable metallic walls such as Ir walls, so that no external active cooling is required, and to heat the lateral walls which are no longer covered with solidified melt conductively and optionally in addition by induction, preferably locally, so that the melt is indirectly heated through the lateral walls.

First, the invention provides a device for refining an inorganic non-metallic melt. The device is preferably suitable for continuous refining. The melt is preferably a glass melt for producing a glass and/or a glass ceramic.

The device comprises the following components:
  a refining crucible with an upper side and a lower side, which crucible is defined at least by lateral walls that have a metallic lining as a melt contact surface on an inner surface thereof;
  at least one heating means for conductively heating the lining by an electric current in the lining, so that the melt is heatable by the heated lining, the heating means and the lining being connected to one another by feeding means, wherein
  the feeding means establish contact with the lining by at least one upper connection and at least one lower connection in such a manner that at least in the lining of the lateral wall, at least in sections thereof, an electric current can be generated running from the upper side to the lower side or from the lower side to the upper side.

The device comprising the following components may also be described as follows:
  a refining crucible which is defined at least by lateral walls that have a metallic lining as a melt contact surface on an inner surface thereof, so that a volume for refining the melt is formed at least in the refining crucible, which volume is defined by a base surface, a top surface and a circumferential surface,
  at least one heating means for conductively heating the lining by an electric current in the lining, so that the melt is heatable by the heated lining, wherein the heating means and the lining are connected to one another by feeding means, wherein
  the feeding means establish contact with the lining in such a manner that an electric current can be generated at least in sections of the lining, running from the top surface to the base surface, or from the base surface to the top surface.

Also within the scope of the invention is a method for producing a glass and/or a glass ceramic. The method comprises the steps of:
  melting a batch to provide a glass melt;
  refining the glass melt by increasing the temperature of the glass melt at least in a volume or refining volume which is adjacent to a lateral wall, at least portions thereof, wherein at least the lateral wall is heated conductively by an electric current, at least in sections thereof;

wherein an electric potential difference is provided in the lateral wall in such a manner that the direction of current flow in the lateral wall is either from top to bottom or from bottom to top;

homogenizing and/or conditioning the refined glass melt;

shaping and/or cooling down and/or heat treating the homogenized and/or conditioned glass melt, so that a glass and/or a glass-ceramic can be provided.

The method comprising the following steps may also be described as follows:

melting a batch to provide a glass melt;

refining the glass melt by increasing the temperature of the glass melt at least in a volume defined by a base surface, a top surface and a circumferential surface, wherein the circumferential surface is adjacent to a lateral wall that is conductively heated by an electric current, at least in sections thereof; wherein an electric potential difference is or can be provided in the lateral wall in such a manner that the direction of current flow in the lateral wall is either from the top surface to the base surface or from the base surface to the top surface;

homogenizing and/or conditioning the refined glass melt;

shaping and/or cooling down and/or heat treatment of the homogenized and/or conditioned glass melt, so that a glass and/or a glass-ceramic can be provided.

In a preferred embodiment of the method, the lateral wall comprises a lining on an inner surface thereof, so that the volume or the circumferential surface is adjacent to the lining and the electric potential difference is provided in the lining and the melt is heatable through the lining.

Furthermore, a device according to the invention or a method for carrying out the invention may also be described as follows. The device comprises the following components:

a refining crucible having a upper side and a lower side and being defined at least by lateral walls which preferably have a metallic lining as a melt contact surface on an inner surface thereof;

at least one heating means for conductively heating the lateral wall, preferably the lining, by an electric current in the lateral wall, preferably in the lining, so that the melt is heatable by the heated lateral wall, preferably by the lining, the heating means and the lateral wall, preferably the lining, being connected to one another by feeding means, wherein the feeding means establish contact with the lateral wall, preferably with the lining, by at least one upper connection and at least one lower connection, the feeding means comprising at least one upper connecting member and at least one lower connecting member for contacting the lateral wall, preferably the lining. The method can be formulated in method steps in correspondence to the respective device features.

In particular, the method can be carried out using the device according to the invention. The device according to the invention is especially adapted to perform the method according to the invention. Preferably, the method according to the invention can be performed continuously.

The conductive heating of the lateral wall and preferably of the lining of the lateral wall according to the invention is an electric resistance heating of the lateral wall. Relevant herein is the direction of current flow generated in the lateral wall. That is to say, the electric current flows from top to bottom or vice versa. The current flow substantially in the entire lateral wall runs either from the upper side or top surface to the lower side or base surface, or vice versa. Preferably, the current flow extends around the entire circumference of the lateral wall from the top surface to the base surface or from the upper side to the lower side, or vice versa. However, this does not mean that the direction of current flow is parallel and/or vertical and/or straight throughout the entire lateral wall.

The conductively heated lining covers sections of or the entire inner surface of the lateral wall. Preferably, the lining completely provides the melt contact surface of the refining crucible. The lining is provided by a sheet metal. The lining has a thickness in an order of magnitude from 0.2 mm to 3 mm, for example, preferably from 0.5 mm to 2 mm. In one embodiment of the invention, the lining has a modified cross-section in sections thereof, so that in the section with the modified cross-section the temperature may be selectively adjusted through a modified current density.

In one embodiment, the lining forms a collar, which covers sections of or the entire upper surface of the lateral wall. Preferably, the collar can be heated conductively, entirely or in sections thereof.

In another embodiment of the invention the refining crucible has a bottom, which is formed at least by the lining. The bottom provides the lower side. The base surface adjoins the bottom. Preferably, the bottom cannot be heated conductively, or only in sections thereof, since, generally, the bottom of the refining crucible is at the same potential or the bottom is set to the same potential. However, depending on the embodiment, it is also possible to have a current flow in the bottom, for example when using a single heating means arranged at one side. In one embodiment of the invention, the lateral walls are inclined with respect to the bottom of the refining crucible.

The melt is heated to a refining temperature of the melt. The temperature for refining the melt depends on the respective type of glass. Generally, the maximum temperature of a melt that enters the refining crucible or the refining zone is at least about 200° C. lower and preferably not more than about 600° C. lower, preferably about 400° C. lower than the maximum temperature of the melt within the refining crucible or refining zone. Generally however, the melt is heated to a temperature of more than 1500° C., preferably more than 1700° C., most preferably more than 1800° C.

The refining crucible and especially the lining are not actively cooled. Cooling means for selective large-area or integral cooling of the refining crucible and especially the lining thereof are not provided. Preferably, this generally results in a temperature difference between the melt contact surface of the lateral wall, preferably the lining, and the melt of not more than 50° C., preferably of not more than 10° C.

The heating of the lateral wall, preferably of the lining, and/or the throughput of the melt in the refining crucible, and/or the heat transport through the wall or lateral wall of the refining crucible are adapted to one another such that a balance is reached between the supplied energy and discharged energy, and so an overheating of the wall materials does not occur.

However, it is necessary that the materials which are used to construct the refining crucible exhibit an appropriate temperature resistance. For example, the lateral wall, preferably the lining, has an appropriate temperature stability of at least 1500° C., preferably at least 1700° C., most preferably at least 1800° C.

For implementing temperatures in a range below 1700° C., the following metals may be used for constructing the lateral wall, preferably the lining. The metal is at least one metal selected from a group comprising Pt, Rh, Ir, Ta, Mo, W, and Nb.

For implementing temperatures in the particularly preferred range of more than 1800° C., the following metals may be used for constructing the lateral wall, preferably the lining. The metal is at least one metal selected from a group comprising Ir, Ta, Mo, W, and Nb.

Preferably, the lining is an iridium lining and is formed by iridium or an iridium alloy. Such an iridium lining has an iridium content of more than about 50 wt. %, preferably more than about 90 wt. %, most preferably more than about 99 wt. %. The preferred temperatures indicated above are feasible with the iridium lining, for example.

Besides temperature resistant materials, materials are preferred which exhibit a thermal conductivity as low as possible to have the lowest possible energy loss to the environment. Since this is generally difficult to realize using a single material, in a preferred embodiment the lateral walls have a multi-layered structure.

In one embodiment, the lateral walls include at least a first layer preferably adjacent to the lining, and a second layer. The first layer has a higher temperature stability or heat resistance as compared to the second layer. The second layer has a lower thermal conductivity as compared to the first layer. The first layer essentially provides stability to the system. The first layer has an increased bearing strength as compared to the second layer. The second layer essentially provides thermal insulation for the system. Preferably, the first layer has a substantially L-shaped cross-section, and one leg thereof extends outwards above the second layer.

In another embodiment, the lateral walls include a third layer which is arranged between the first layer and the lining. Preferably, the third layer comprises a fabric. For example, the third layer enables the lining to slide on the first layer upon thermal expansion, and it may cause a first thermal jump or thermal adjustment to the first and/or the second layer.

The first layer consists of or comprises a spinel. The first layer preferably has a thermal conductivity from 2 W/mK to 4 W/mK. The second layer comprises an insulating material, preferably an insulation brick. It consists of or comprises FL30. The second layer preferably has a thermal conductivity of less than 1 W/mK. In particular, the ratio of the thermal conductivity of the first layer divided by the thermal conductivity of the second layer is at least 2. The third layer may comprise a zirconium oxide non-woven fabric.

The insulation or the heat flow through the individual layers is adapted in such a manner that in none of the layers of the lateral wall the respective critical temperature is substantially exceeded or exceeded for so long that a collapse of the layer or the lateral wall would occur. The choice of the individual materials and/or of the dimensions and/or geometry of the individual layers and/or of the lateral wall and/or of the device for refining is made according to the respective requirements, such as refining volume, throughput, temperature of the melt, etc.

Not only the structure of the refining crucible is of relevance, but also the design of the connections or current feeding means to the lateral wall or the lining, respectively, for conductively heating the lateral wall or the lining, which should in particular provide for gradual heating of the melt.

The feeding means establish contact to the lateral wall, preferably the lining, via at least one upper connection and at least one lower connection for the lining. The upper and lower connections provide the interface from the feeding means to the lining. Between the upper connection and the lower connection an electrical voltage is applied to provide the electric current for conductive heating. Preferably, the applied voltage is an alternating voltage, so that the electric current in the lateral wall, preferably in the lining, is alternating. The upper connection is associated with the upper side and the lower connection is associated with the lower side. However, this does not mean that the upper connection has to be arranged spatially above the lower connection (an example is shown in FIG. 6.*o*). Rather, it means that via the upper connection the electric current is supplied to or led away from the lining of the lateral wall, directly (see for example FIG. 6.*e*), or indirectly (see for example FIG. 6.*a*), the electric current then runs within the lining of the lateral wall from the upper side to the lower side or from the lower side to the upper side, and is then led away or supplied via the lower connection.

In one embodiment of the invention, the feeding means comprise at least one upper connecting member and at least one lower connecting member for making contact with the lining. In this case, the upper connecting member is associated with the lateral wall and/or the collar of the lining. The lower connecting member is associated with the bottom of the lining. Each of the upper and lower connecting members is electrically conductive, in particular at least in sections thereof. Each of the upper and lower connecting members is a metallic component or comprises a metal.

In one embodiment, the upper connecting member is formed as a jacket which extends around sections of or completely around the circumference of the lateral wall and preferably bears against the outer surface of the lateral wall.

In one embodiment, the lower connecting member is formed as a plate or sheet, which extends around sections of or completely around the circumference of the base surface and/or bottom and preferably abuts an outer edge of the base surface and/or bottom. The lower connecting member extends for example through the lateral wall or beneath the lateral wall to the outside, in particular in a manner to be contactable outside the refining crucible.

In another embodiment of the invention, the feeding means comprise an upper coupling means and a lower coupling means for electrically connecting the lining with the heating means, preferably via the upper and/or lower connecting members.

In this case, in one embodiment, the upper coupling means extend around sections of or completely around the circumference of the refining crucible, preferably around the upper connecting member. In one embodiment, the lower coupling means on the other hand extend around sections of or completely around the circumference of the refining crucible, preferably around the lower connecting member.

Preferably, the upper and/or lower coupling means are formed as a metallic plate or sheet metal, so that the upper and/or the lower connecting member and/or the lining can be contacted two-dimensionally. Preferably, a thickness thereof ranges from about 1 mm to about 50 mm, more preferably from about 2 mm to about 20 mm. In a preferred variation of the invention, the feeding means, preferably the upper connection and the lower connection, have an enlarged cross-section as compared to the lining, so that the current density in the lining is increased with respect to the current density in the feeding means. However, the current density generated within or in the lining is essentially the same. However, it is possible as well to selectively modify the temperature in the lining by altering the cross-section of the lining.

One embodiment of the invention comprises means for cooling which are associated with the feeding means, so that the feeding means are coolable, at least in sections thereof. This permits to reduce an undesired heat discharge to the environment, for example, and/or an overheating of the employed material.

In one embodiment, the heating means are adapted to supply the electric current at a frequency from 10 to 100 Hz, preferably at 50 Hz. This results in a vibration of the refining device and promotes a rising of bubbles in the melt.

In one embodiment, the heating means is designed as a transformer. The specific design of the heating means that can be used herein depends on the respective requirements to be achieved, such as refining volume, throughput, temperature of the melt, etc. In one embodiment of the invention, current densities of up to 20 A/mm$^2$, preferably of up to 30 A/mm$^2$, are obtainable in the lateral wall, preferably in the lining.

Generally, the potential difference applied to the lateral wall, preferably the lining, may be of an order of magnitude ranging from 1 V to 50 V, and/or the total current may be of an order of magnitude ranging from 5 kA up to 100 kA. The voltage is an AC voltage with a frequency ranging from 10 Hz to 10 kHz, for example.

In another embodiment of the invention, means are provided for inductively heating the lining, so that, in addition, the melt is preferably inductively heated, at least portions thereof.

In another embodiment, gas feeding means or supply lines are provided, which extend through the lateral walls or through the wall of the refining crucible in such a manner that a defined atmosphere, preferably of a non-oxidizing fluid, is providable at a side of the lining facing away from the melt. In one embodiment, the fluid is provided as a gas, preferably comprising nitrogen, argon, helium, and/or forming gas.

Finally, also within the scope of the invention is a glass article, preferably an optical and/or technical glass, and/or a glass-ceramic which can be or has been produced by the method according to the invention.

The present invention will now be described in detail by way of the following exemplary embodiments. For this purpose, reference is made to the accompanying drawings. The same reference numerals used in the various drawings refer to the same parts.

FIGS. 1.*a* and 1.*b* schematically illustrate, by way of example, the individual steps or components in the manufacturing of glass, in a plan view (FIG. 1*a*) and a side view (FIG. 1.*b*).

FIGS. 2.*a* and 2.*b* show the temperature profiles of a melt obtained in a refining crucible according to the invention, the crucible, by way of example, having an inlet in the bottom ("bottom feed"/FIG. 2.*a*), or a lateral inlet in the upper region ("top feed"/FIG. 2*b*), and each one having a lateral outlet.

FIG. 2.*c* shows simulation results for the residence time of the melt in the refining crucible during which the melt is exposed to a refining temperature of more than 1750° C.

FIGS. 3.*a* and 3.*b* schematically illustrate a first and a second exemplary embodiment of a refining crucible with a single-layered and a double-layered wall, respectively.

FIGS. 4.*a* to 4.*d* schematically illustrate a third exemplary embodiment of a refining crucible having a three-layered wall, in a vertical cross-section without (FIG. 4.*a*) and with electrical coupling means (FIG. 4.*b*), in a plan view (FIG. 4.*c*), and in a horizontal cross-section (FIG. 4.*d*).

FIGS. 5.*a* to 5.*c* show modifications of the embodiment shown in FIG. 4.*a* according to the invention.

FIGS. 6.*a* to 6.*o* illustrate various embodiments of the refining crucible with different arrangements of the contacts or upper and lower connections for power supply.

FIG. 7 is a schematic view of the detail in circle Z1 of FIG. 4.*a*, with gas supply lines.

FIGS. 8.*a* and 8.*b* are schematic views of the detail in circle Z2 of FIG. 4.*a*, illustrating a first and a second exemplary embodiment of the interface region.

DETAILED DESCRIPTION OF THE INVENTION

FIGS. 1.*a* and 1.*b* illustrate individual steps of the manufacturing of glass and two possible positions of a refining crucible 3 constructed according to the invention and operated according to the invention. For exemplary purposes, a system for melting, refining, conditioning, homogenizing, and shaping of a glass melt 1 is illustrated, and hence a system for producing glass.

The first process step in the manufacturing of glass is the melting of the starting material, namely the batch, in a melting trough 2. By way of example, an open melting crucible 2 is shown, with an open melt surface 1*a*. Once the batch has become viscous, a first pre-refining of the melt 1 starts in melting trough 2.

In order to achieve maximum uniformity and absence of bubbles in the melt 1, thorough mixing and degassing of the glass melt 1 is required. Therefore, the melting is followed by refining the glass melt 1 in a refining zone 3. The refining zone 3 is also referred to as refining chamber 3, or refining crucible 3. A major objective of refining is to remove gases which are physically and chemically bound in the melt from the melt 1.

Two possible positions for a refining crucible 3 constructed and operated according to the invention are shown.

On the one hand, refining crucible 3 according to the invention may be arranged immediately or directly downstream crucible 2 and may be designed as a refining crucible 3 having an inlet in the bottom and a lateral outlet at the upper side (see the temperature profile shown in FIG. 2.*a*). In this variation, refining crucible 3 is defined by lateral walls 10, or circumferential surface 32, respectively. It has an open base surface 33 and an open top surface 31. Base surface 33 may also be referred to as a bottom or lower side. Top surface 31 may also be referred to as an upper side (see the additional diagram in FIG. 3.*b*).

However, it is also possible that first a kind of channel is arranged between melting crucible 2 and refining crucible 3, which channel is more of a lateral inlet in the present case, via which the melt 1 is supplied to refining crucible 3. In this case, the latter may be formed with a lateral inlet 3*a* and a lateral outlet 3*b* in the upper region of refining crucible 3 (see the temperature profile shown in FIG. 2.*b*).

Homogenizing refers to a dissolution and uniform distribution of all components and to an elimination of schlieren. Conditioning of a melt means to adjust the temperature of the melt 1 as quickly and accurately as possible. This is for instance accomplished in channel systems of glass melting furnaces when the melting and refining processes are completed and the glass is to be brought to a desired molding temperature.

Refining crucible 3 is followed by a channel 4 downstream melt 1 in the flow direction thereof, in which conditioning of the melt 1 is accomplished. Therefore, channel 4 may also be referred to as a conditioning means 4. Through the latter, the melt 1 is supplied to a homogenizing means 5 comprising an agitator means 5*a* arranged in a trough, which serves to homogenize the melt 1 and to remove schlieren from the melt 1. Homogenizing of glass melt 1 is followed by a shaping 6 of the glass. Generally, the final glass is always subject to a shaping treatment. Depending on the product, the glass is shaped differently. There are five basic methods for processing glass in a plastic state: casting, blowing, drawing, pressing, and rolling. Shaping begins either after a slow, complete solidification of the glass mass, or in a half-liquid, still viscous state of the glass, or even already at a high temperature and in a highly liquid state of the glass mass. In particular for producing a glass-ceramic, another heat treatment is required, which is known as ceramization.

FIGS. 2.*a* and 2.*b* show the temperature profile of a melt 1 as a result of a simulation, in each case in a refining crucible 3 according to the invention. Specific exemplary embodiments of a refining crucible 3 according to the invention for the temperature profile as illustrated in FIG. 2.*b* are shown in FIGS. 3.*a*, 3.*b*, 4.*a*, and 5.*a* to 5.*c*. In these embodiments, a space or volume is formed in the refining crucible 3 above melt 1. That means, in each case an open melt surface 1*a* is provided.

First, FIG. 2.*a* shows the embodiment and positioning of a refining crucible according to the invention mentioned first in the description of FIG. 1. This crucible has an inlet for the melt 1 arranged in the bottom of refining crucible 3. The outlet, by contrast, is arranged in the upper region of refining crucible 3. Thus, refining crucible 3 constitutes a kind of a vessel which is open at its end faces, i.e. at base surface 33 and top surface 31, or at its upper side and bottom side. Refining crucible 3 may have a shape of a straight or an inclined truncated cone in sections thereof. At the inner surface of refining crucible 3 a lining 50 is disposed as a melt contact surface which can be heated conductively, and optionally in addition thereto inductively.

Commonly, the maximum temperature of the melt 1 entering refining crucible 3 is at least about 200° C. and preferably not more than about 400° C. lower than the maximum temperature of the melt 1 within refining crucible 3 or refining zone 3. For example, melt 1 enters at a temperature of about 1500° C. to about 1600° C. into the high-temperature refining zone in refining crucible 3, which in particular has a temperature mostly preferred in a range above 1800° C. Melt 1 is gradually heated indirectly by heated lining 50, and rises. At the end or in the region of the upper edge of refining crucible 3, i.e. at the outlet of refining crucible 3, the melt 1 has its highest temperature and hence its lowest viscosity. The maximum temperature, in this case, ranges from about 1850° C. to about 1900° C. Moreover, in this region the distance to the melt surface 1*a* is shortest. Any bubbles existing or having been produced in the melt 1 exit from melt surface 1*a*.

The temperature prevailing in lining 50 is greater than the temperature in the melt 1 which is in contact with lining 50. However, it is of a similar order of magnitude as the temperature in the melt 1. The difference of the temperature of that portion of the melt which is in contact with lining 50 and the temperature within lining 50 is not more than 100° C., preferably not more than 50° C.

FIG. 2.*b* shows a second embodiment of a refining crucible 3 designed according to the invention. It has an inlet 3*a* for the melt 1, which is arranged in the upper region of refining crucible 3. Outlet 3*b* is also arranged in the upper region of refining crucible 3, but on an opposite side relative to inlet 3*a*. Refining crucible 3 is a kind of a vessel which is open at its upper end face or top surface 31 or upper side and closed at its lower side or base surface 33 by a bottom.

Refining crucible 3 may have a shape of a straight or oblique truncated cone in sections thereof. At the inner surface of refining crucible 3, a lining 50 is disposed as a melt contact surface, which is heated conductively and optionally, in addition thereto, inductively. Melt 1 laterally enters into refining crucible 3 from above. Melt 1 enters refining crucible 3 at a temperature from about 1500° C. to about 1600° C. First, the melt 1 falls downwards within refining crucible 3. It flows along heated lining 50. By heated lining 50 it is gradually heated and rises upwards at the opposite side of refining crucible 3. At the end or in the region of the upper edge of refining crucible 3, i.e. at the output or outlet 3*b* of refining crucible 3, melt 1 has its maximum temperature and thus its lowest viscosity. The maximum temperature, in this case, ranges from about 1850° C. to about 1900° C. Moreover, in this region the distance to the melt surface 1*a* is shortest. Bubbles existing or having been produced in the melt 1 exit from melt surface 1*a*. The temperature prevailing in lining 50 is greater than the temperature in the melt 1 which is in contact with the lining 50. However, it is of a similar order of magnitude as the temperature in the melt 1. The difference of the temperature of the portion of melt 1 which is in contact with lining 50 and the temperature within lining 50 is not more than 100° C., preferably not more than 50° C.

Simulation results (see FIG. 2.*c*) show that the residence time of the melt 1 in refining crucible 3 according to the invention during which the melt is exposed to a refining temperature of more than 1750° C. is increased as compared to the system described in the prior art (see the introductory part of the description). So-called short-circuit flows are prevented. A short-circuit flow of the melt 1 refers to a flow or a portion of the melt 1 with merely a short residence time in refining chamber 3, so that only an inadequate refinement is achievable for this flow or this portion. Surprisingly, it has been found that it is not necessary to provide a large temperature gradient in the refining chamber 3, such as presently done for example by employing cooled walls (see the introductory part of the description). The temperature profile which can be obtained with a refining crucible 3 constructed according to the invention without any active cooling will suffice to generate stable convection rolls.

According to the invention, there are not used any actively cooled walls or surfaces, in particular with temperatures of more than about 1700° C. Instead, sufficiently insulated walls are used, so that the wall material or insulation material is not overstressed. This is because the walls or the first and/or second layers of the wall are at least as hot as the glass in indirect contact via the lining. The insulation is adapted or a sufficient heat flow is adjusted, so that on the one hand the wall and insulation materials are not overstressed, and on the other the heat flow through the wall is reduced, preferably minimized, in view of economic efficiency. This is achieved by appropriately selecting the wall materials and the thickness of the walls or of the individual layers.

Specific examples of a refining crucible 3 according to the invention are given below.

FIG. 3.*a* schematically illustrates a cross-section of a first exemplary embodiment of a refining crucible 3.

The refining chamber 3 has a single-layered structure. Lateral walls 10 and bottom 23 of refining chamber 3 are each formed by a wall 11. The lateral walls 10 and bottom 23 together define the interior of refining chamber 3. They define the base surface 33, circumferential surface 32 and top surface 31 of the refining zone 3 (see FIG. 3.*b*). Lateral walls 10 and bottom 23 are constructed of a refractory material. The interior or the melt contact regions of refining chamber 3 are lined with a metallic material 50, preferably a sheet metal. The inner surface of refining chamber 3 is covered by the metallic lining 50.

Lining 50 preferably completely provides the melt contact surface of refining crucible 3. Lining 50 covers the bottom 23 and the lateral walls 10 of refining crucible 3. Additionally, lining 50 extends beyond the inner upper edge of refining crucible 3 or the inner upper edge of the lateral wall 10 thereof. The lining rests on the upper surface 10a of lateral wall 10 thereby covering it preferably completely. So, lining 50 forms a collar 51. Collar 51 is inclined relative to lateral wall 10. Collar 51 is so to say "bent". It forms an angle of about 45° to 135°, in the present case of about 90°, with lateral wall 10. Moreover, lining 50 or collar 51 of lining 50 also extends beyond the outer upper edge of refining crucible 3 or the lateral wall 10 thereof. This portion bears against the outer surface of refining crucible 3 and covers an upper portion of the lateral wall 10 thereof. On the one hand, collar 51 extends at least sufficiently far to the side, so that a critical temperature for the lateral walls 10 is not or at least not significantly exceeded at lateral walls 10. On the other hand, the width of collar 51 is limited by an increasing tendency for a lateral overflow of the crucible. Preferably, the width and/or length of collar 51 is selected such that short-circuit flows can be substantially avoided.

The portion of lining 50, which extends downwards at the outer surface of lateral wall 10, forms an upper connection 60 and 61 for a heating means. In the present example, a first heating means 71 and a second heating means 72 are used for conductively heating the lining 50. For this purpose, a first upper connection 60 (the reference numeral is not indicated in this figure) for the first heating means 71 and a second upper connection 61 for the second heating means 72 may be provided. First upper connection 60 and second upper connection 61 are arrange opposite to one another (see also FIGS. 6.a to 6.g). The portion of lining 50, which forms the bottom 53 of refining chamber 3, provides the other, in this case the lower connection 62 and 63 for heating means 71 and 72. A first lower connection 62 (the reference numeral is not indicated in this figure) for the first heating means 71 and a second lower connection 63 for the second heating means 72 may be provided.

Each of the first and second heating means 71 and 72 preferably comprise a transformer. By means of the two transformers, lining 50 is heated conductively. However, it is also possible for the melt 1 to be conductively heated only by a single heating means, in the present case by one of the two heating means 71 and 72. Thus, substantially, not the melt 1 itself is heated, but it is heated indirectly through the conductively heated lining 50.

Further details on the underlying principle of heating according to the invention will be explained in the description of FIGS. 4.a to 4.d.

The use of additional heaters, preferably for directly heating the melt 1, for example by means of electrodes arranged in the melt 1, or by means of radiant heaters, for example using a burner or an electrically heated heat radiator, are possible.

To give an example, in FIG. 3.a, optional burners 41 are arranged in the region above melt surface 1a, in the so-called upper furnace 40, in order to prevent cooling of the melt surface 1a, if necessary. Together with burners 41, the upper furnace 40 is defined by a ceiling 43 and lateral walls 42. Ceiling 43 and lateral walls 42 are made from a refractory material, such as Quarzal® (silicon-rich ceramic), mullite and/or HZFC (High-Zirconia Fused Cast). Lateral walls 42 extend downwardly beyond the upper edge of refining crucible 3 or beyond the upper edge of the lateral walls 10 thereof.

In the transition area between upper furnace 40 and refining crucible 3, a gap is provided, in particular to allow to tolerate thermal expansions. As described above, lining 50 also extends into this region. In this transition area, a means for cooling 81, preferably water cooling, such as a water-carrying tube is arranged, in particular to seal the interior space defined by refining crucible 3 and upper furnace 40 from the environment. The melt 1 which also flows into the transition area freezes there and seals the transition area. A so called glazing collar 80 is formed. In this way, the lining 50 may be prevented from coming into contact with the oxygen present in the environment. This is particularly important when the lining 50 is formed from iridium, for example, which is not resistant to oxidation at high temperatures. Glass melt 1 covers the entire lining 50 or the entire collar 51, so that there is no 3-phase boundary. More details and further refinements of glazing collar 80 are shown in FIGS. 8.a and 8.b.

The portion of lining 50 which forms the bottom 53 rests upon a wall 23 which provides stability to the bottom. This wall 23 provides a kind of foundation for the bottom. In order to effectively shield the refining crucible 3 from the environment, the foundation 23 is enclosed by a gas-tight bin 24.

In summary, FIG. 3.a shows a refining crucible 3 which includes a wall 10 and 23 having a single-layered structure. The single layer 11 of wall 10 provides mechanical strength or stability for the refining crucible 3, especially at temperatures of more than about 1700° C. in the melt 1. Moreover, this single layer 11 exhibits a sufficiently low thermal conductivity, so that the generated heat remains in the system and is not emitted to the environment. As shown in FIG. 3.a, bottom 23 and lateral walls 10 may be formed integrally, i.e. may be provided by a single component.

FIG. 3.b illustrates a volume for refining which is defined by a base surface 33, a top surface 31 and a circumferential surface 32. The refining volume needs not to be limited to the described volume but may also include the volume above collar 51. Further, FIG. 3.b shows a modification of the system 3 shown in FIG. 3.a. Lateral wall 10 has no longer a single-layered structure but a double-layered structure. The first layer 11 which is adjacent to the lining 50 has a temperature stability similar to the temperature stability of the lining 50 and provides the necessary stability to crucible 3. Preferably, first layer 11 exhibits a temperature stability of up to about 2000° C. In one exemplary embodiment, first layer 11 is made of a refractory ceramic material, preferably based on $ZrO_2$ and/or spinel.

Second layer 12 has a lower temperature stability as compared to first layer 11. However, in return, second layer 12 has a lower thermal conductivity than first layer 11. Thus, second layer 12 provides the essential thermal insulation, so that the generated heat remains in the system and is not emitted to the environment. For example, second layer 12 may be made of FL30. Second layer 12 has a temperature stability of about 1600° C. to about 1700° C.

First layer 11 has an L-shaped cross-section. One leg thereof extends outwardly over second layer 12, thereby forming a collar for second layer 12. In this manner, the second layer 12 is not in direct thermal contact with heated lining 50.

The bottom 23 or foundation 23 of the bottom has a temperature stability of up to about 2000° C. For example, bottom 23 is a wall made of a refractory ceramic material, preferably based on $ZrO_2$ and/or spinel.

FIGS. 4.a to 4.d schematically illustrate a third embodiment of a refining crucible 3 having a three-layered wall 10. First, FIG. 4.a shows a horizontal cross-section of refining crucible 3 without the electrical coupling means 66 and 68 to the pair of heating means 71 and 72, which are not shown here.

Refining crucible 3 has a so-called "top-feed", i.e. an inlet 3a from above. The flow direction 1b of the melt 1 is indicated by arrows. The melt 1 flows laterally, in the present case from the left, along the upper surface of lateral wall 10 into crucible 3 and flows downwards after having passed the edge. By being successively heated inside crucible 3 through the heated wall 10 or lining 50, the melt 1 rises upwards again, rising above the upper edge of lateral wall 10, and then flows laterally outwards, to the right side in the present example. The melt 1 flows in parallel to or along the connecting line of the two heating means 71 and 72. In one variation of the invention, the melt may also flow perpendicular or transversely to this connecting line. For example, the connecting members 66 and 68 or flanges are rotated by 90° relative to the flow direction 1b of the melt 1. In FIGS. 4.b and 4.c it is indicated that the flow direction 1b of melt 1 may extend either out of the image plane as well as within the image plane.

The collar 51 shown at the left defines the inlet 3a for the glass melt 1. The collar 51 shown at the right defines the outlet 3b for the glass melt 1. Since the lining 50 is fully "energized" or conductively heated, the melt 1 is heated not only in the inner space of crucible 3 but already on the left collar 51 and still on the right collar 51 as well.

The interior or inner volume of refining crucible 3 forms the refining space which is defined by a base surface 33, a top surface 31 and a circumferential surface 32. The refining volume needs not to be limited to the described volume but may also include the volume above collar 51. Circumferential surface 32 is bounded or defined by lateral wall 10 or inner surface 10b of lateral wall 10, or by the lining 50 of lateral walls 10. Base surface 33 is limited or defined by the bottom 53 of lining 50. Top surface 31 is defined by the upper opening of crucible 3, for example.

The structure of wall 10 is similar to the structure shown in FIG. 3.b. As a first difference, an additional third layer 13 is arranged between the first layer 11 which provides the essential mechanical stability to crucible 3, and lining 50. Generally, third layer 13 is a temperature resistant fabric, preferably up to about 2100° C. One example of a fabric is felt. One example of the material is $ZrO_2$. In a preferred embodiment, third layer 13 comprises a $ZrO_2$ felt. The third layer 13 effects mechanical protection for the first layer 11 from the lining 50, for example during installation. In addition, lining 50 may slide on third layer 13 during thermally related expansion or contraction. Furthermore, third layer 13 serves as a kind of trap for particles evaporated from the lining. Third layer 13 covers the upper surface 10a and the inner surface 10b of lateral wall 10. It forms a kind of second lining.

Melt 1 is heated by conductively heating the lateral wall 52 of lining 50, at least in sections thereof, by an electric current. In the present example, the entire lining 50 is conductively heated. This is because the power is supplied at the upper outer edge of lining 50 and at the lower inner edge where lateral wall 52 merges into bottom 53.

An electric current is generated by applying voltages U1 and U2 thereby generating a potential difference in the lining, when U1≠U2. The direction of current flow in the lining 50 is indicated by arrows, for U1>U2 (see FIG. 4.b).

In the illustrated example, an electric potential difference is provided in lateral wall 52 of the lining 50 in a manner that the direction of current flow in lateral wall 52 is from the top surface 31 to the base surface 33, or from the upper side 3c to the lower side 3d. Since collar 51 of lining 50 is heated as well, the direction of current flow is from the outer side of collar 51 inwardly towards lateral wall 52, and within lateral wall 52 from the top surface 31 to the base surface 33. Bottom 53 is generally not conductively heated, or at least not in case of two heating means 71 and 72, since it is at a uniform potential and so there is no current flow. There is no current flow from the left side of collar 51 to the right side of collar 51, i.e. not from inlet 3a towards outlet 3b, or vice versa.

In this embodiment, heating is accomplished using two heating means 71 and 72. Power supply is not effected via a point but rather via a surface. For this, reference is made to FIGS. 4.b to 4.d.

Lining 50 may be provided as a single component. An advantage thereof is that no or only few edges have to be sealed. In the present example, however, lining 50 is formed in two parts. Lateral walls 52 and collar 51 of lining 50 are provided by a first, preferably single-piece component. Bottom 53 of lining 50 is provided by a second component. The lower surface of lateral wall 52 rests upon bottom 53. Preferably, lateral wall 52 and bottom 53 are welded together.

In a preferred embodiment, the surface area of the component which provides the bottom 53 of lining 50 is larger than the base surface 33 of refining zone 3 (see FIG. 4.d). For better illustration, this may be compared with a cup which is seated on a saucer. The saucer generally has a larger surface or a larger diameter than the bottom of the cup. Thus, a sort of extension or collar is formed. This offers the advantage that contacts may be established easily with this collar and thus with the bottom 53. Preferably, this region is to be formed thicker than the base surface 33, so that the Joule heating can be kept to a minimum here.

The bottom 53 of lining 50 is contacted using a lower connecting member 65 (see also FIG. 4.d). The latter contacts lower connections 62 and 63 (see FIGS. 6.a to 6.g). Lower connecting member 65 is associated with the bottom 53. Preferably, lower connecting member 65 is an annular flange 65, preferably a circular flange. Annular flange 65 may engage the outer edge of bottom 53, as shown. But it is also possible to provide an extension element 64 as an intermediate piece, in order to allow to compensate for thermal changes in length (see the extension plate 64 in FIGS. 3.a and 3.b). Preferably, annular flange 65 is welded to bottom 53. The ring 65 preferably extends completely around the circumference of bottom 53. Ring 65 is made of a metal, for example constituting a nickel flange 65. Ring 65 extends through lateral wall 10 or beneath lateral wall 10 to the outside. Connecting member 65 provides one of the two electrical connections between lining 50 and the pair of heating means 71 and 72, in particular via lower coupling means 66 (see FIG. 4.d).

The collar 51 of lining 50 is contacted via an upper connecting member 67 (see also FIG. 4c). Upper connecting member 67, herein, is associated with lateral wall 52 and collar 51. It contacts the upper part of lining 50. Upper connecting member 67 engages the outer surface 10c of lateral wall 10. It constitutes a jacket, for example a cylindrical jacket, which preferably extends completely around the circumference of crucible 3 or around outer surface 10c of the lateral wall 10 thereof. Jacket 67 is made of a metal, for example constituting a nickel flange 67. Upper connecting member 67 provides the other one of the two electrical connections between lining 50 and heating means 71 and 72, in particular via upper coupling means 68.

FIG. 4.b is similar to FIG. 4.a. Additionally, the coupling means 66 and 68 to heating means 71 and 72 are illustrated therein. FIG. 4.c shows the system of FIG. 4.b in a plan view. FIG. 4.d shows the system of FIG. 4.b in a cross-section along section line A-A.

Coupling means 66 and 68 establish an electrical connection between lining 50 and heating means 71 and 72. Coupling means 66 and 68 are formed as plates which are electrically coupled to flanges 65 and 67, preferably by abutting thereto. Coupling means 66 and 68 and flanges 65 and 67, respectively, may also be formed integrally, or in one piece.

Coupling means 66 and 68 extend radially outwards. As shown in FIGS. 4.c and 4.d, they extend completely around the circumference of refining crucible 3. This results in a more uniform current distribution and thus in a more uniform heating of lining 50.

By way of example, two heating means 71 and 72 are used here. The electric currents produced by the two heating means 71 and 72 are supplied to lining 50 from opposite sides and thus at an angle of about 180° to one another. The ideal case of heating would be a uniform current supply around the circumference of lining 50. An example is a rotationally symmetrical power supply. To approximate this ideal case, a plurality of heating means 71 and 72 and/or a plurality of power supply areas may be used. Preferably, the plurality of heating means 71 and 72 and/or the plurality of power supply areas are arranged with an approximately equal angular space to one another. For example two connections spaced by 180° as already shown, or three connections spaced by an angle of 120°, four connections spaced by an angle of 90°, and so on.

Lower connecting member 65 and the associated lower coupling means 66 and upper connecting member 67 and the associated upper coupling means 68 together form the power feeding means for lining 50 and hence for heating the lining 50. Lower connection(s) 62 and/or 63 has/have associated therewith lower connecting member 65 and lower coupling means 66. Upper connection(s) 60 and/or 61 has/have associated therewith upper connecting member 67 and upper coupling means 68. Preferably, feeding means 65 to 68 for lining 50 have a larger cross-section than lining 50. Therefore, the current density in feeding means 65 to 68 is reduced. Thus, the heat is not generated in feeding means 65 to 68 but in the lining 50, so that an undesired heat dissipation for example to the environment is reduced.

In one embodiment, feeding means 65 to 68 for lining 50 are cooled, at least in sections thereof. This allows to reduce an undesired heat loss, especially to the environment, due to a reduced resistance of feeding means 65 to 68. For example, the region of the abutment edge between lateral wall and bottom is equipped with a cooling device. This allows the melt entering into this region to freeze and to provide a seal (see for example the cooling means 81 near extension element 64 in FIGS. 3.a and 3.b).

FIGS. 5.a to 5.c illustrate modifications of the refining crucible 3 presented in FIG. 4.a.

First, FIG. 5.a shows an embodiment in which the lining 50 is not only heated conductively. In one section, lining 50 is additionally heated inductively. For example, collar 51 is additionally heated inductively. Preferably, collar 51 which forms the outlet 3b for the melt 1 is additionally heated. For this purpose, coils 73 are arranged in the region of outlet 3b. In this way, the temperature of the melt 1 may be increased at the end of refining, and thus the refinement of the melt 1 may be promoted, if necessary. The geometry of inductors and the frequency of the oscillating circuit are adapted to the corresponding geometry of refining crucible 3.

FIG. 5.b shows an embodiment in which the thickness of lining 50 is selectively varied, in particular in sections thereof, in order to influence the temperature profile to be generated in lining 50 and thus also that of the melt 1. As an example, the thickness of lining 50 which forms the collar 51 and here the outlet 3b for melt 1 is selected greater than the thickness of the lining 50 and 52 on lateral wall 10. This results in a lower current density and hence in a lower temperature at outlet 3b. In this manner, excessive heating and an associated "evaporation" of melt components can be reduced or prevented, for example.

FIG. 5.c shows an embodiment of refining crucible 3, which has an enlarged collar 51 in the region of outlet 3b as compared to the inlet 3a for melt 1. This allows the heated melt 1 to move over an extended distance where the melt level is low and thus the bubbles need less time to escape. In this manner, refining may be improved. At the same time the melt 1 may cool, so that when subsequently being contacted downstream device 3 no or only slight non-critical corrosion is to be expected. Outlet 3b or collar 51 at outlet 3b is selected or dimensioned such, in particular the length thereof, that the melt 1 can be cooled to a temperature which does not substantially affect or deteriorate the material of a unit downstream refining device 3, such as a refractory material.

One aspect of the invention is based on the fact that at least the lateral wall 10 of refining crucible 3, preferably the lateral wall 53 of lining 50, is preferably conductively heated, at least in sections thereof, or completely. The conductive heating is effected such that in the lateral wall 10 of refining crucible 3, preferably in the lateral wall 52 of lining 50, a potential difference is provided in such a manner that the direction of current flow in lateral wall 10 or 52 is from the top surface 31 to the base surface 33 or from the base surface 33 to the top surface 31. The electric current in lining 50, or in the lateral wall 52 of lining 50 runs from the upper side 3c to the lower side 3d, or from the lower side 3d to the upper side 3c of refining crucible 3.

In this context, FIGS. 6.a to 6.h show a simplified cross-section of a refining crucible 3, more precisely spoken of the lining 50 of a refining crucible 3, with different arrangements of the connections for feeding the electric current or for applying the voltages, respectively. For purposes of a better understanding, connections 60 to 63 are introduced here. They specify the areas in which the current is to be fed into lining 50. These are arranged in different regions of lining 50. The voltages are again referred to as U1 and U2. By way of example, U1 has a positive value with U1>0 V. U2, by contrast, is on ground potential, for example, with U2=0V. The illustrated arrows indicate the direction of current flow.

FIG. 6.a shows a connection or power feeding scheme as already shown in FIG. 4.a. The power feeding scheme is designed for two heating means 71 and 72, in this case. Two upper connections 60 and 61 and two lower connections 62 and 63 are provided. The two lower connections 62 and 63 are arranged at the inner lower edge of refining crucible 3, where the lateral wall 52 merges into the bottom 53 of lining 50. Since the lining 50 which forms the bottom 53 is at the same potential U2, the bottom 53 will not be conductively heated. The two upper connections 60 and 61 are arranged at a respective outer upper edge of the lining 50 which forms the collar 51.

In the figures which follow, an indication of reference numerals 60 to 63 for the two upper and the two lower connections, and of reference numerals 51 to 53 for the portions of lining 50, and of reference numerals 3c and 3d for the upper side and lower side has been omitted.

FIG. 6.b shows a power feeding scheme as already shown in FIG. 5.c. Outlet 3b is enlarged as compared to the inlet 3a of the melt 1. Additionally, collar 51 extends downwards on the outer surface 11c of lateral wall 10. This has already been shown in FIGS. 3.a and 3.b. Thus, connections 60 and 61 are arranged at the outer surface 10c. Otherwise, connections 62 and 63 are identical to the connections 62 and 63 shown in FIG. 6.a. To avoid repetitions, reference is made to the description above.

FIG. 6.c shows a power feeding scheme in which only a single heating means 71 is provided. Although such a power supply is indeed completely asymmetrical, this type of power supply may be sufficient for refining, since local heating along the shortest path between U1 and U2 will result in an increased resistance along this shortest path, so that due to the lower resistance in the less heated areas, the current will gradually "expand" to or "make its way" across the circumference. This is indicated by the dashed arrow. In this variation of the invention, due to this single-sided arrangement of heating means 71 an electric current may even flow in bottom 53.

FIG. 6.d shows a power feeding scheme in which, first, the upper connections 60 and 61 are not arranged at the outer edge of collar 51 but for example midway of collar 51. Also, the lower connections 62 and 63 are no longer in the corner. They are arranged in the bottom 53 itself. In this embodiment, electric current will also flow through some sections of the bottom 53 which will be partly heated together with lateral walls 52.

The lateral walls 52 of lining 50 of the embodiments shown in FIGS. 6.a to 6.d are arranged vertically or perpendicular to bottom 53. By contrast, FIGS. 6.e to 6.h illustrate embodiments in which the lateral walls 52 are inclined with respect to the vertical or upright direction, which gives a cross-section of a trapezoid. Such inclination reduces adherence of bubbles on lateral wall 52, since the bubbles present within a region of interaction with lateral wall 52 generally rise vertically upwards, and not along the inclined lateral wall 52. Preferably, the angle formed between lateral wall 52 and the vertical or upright direction, ranges from 1° to 15°. The bubbles may have been included in the melt 1 and/or may have been produced by the refining.

The adhesion of bubbles may additionally be reduced by feeding the electric current from a heating means 71 and/or 72 into the lining 50 at a frequency (supply frequency) from 10 to 100 Hz. In a simplified embodiment of the invention, a supply frequency typical for the respective country is fed. In Europe, for example, this is about 50 Hz, and in the U.S. about 60 Hz. The result is a vibration of device 3. Due to the high current densities the bubbles are "shaken off" from the lining 50. By using higher frequencies, of for example up to about 10 kHz, the formation of bubbles may at least be reduced, or avoided. For this purpose, heating means 71 and/or 72 may comprise an inverter.

FIG. 6.e shows a power feeding scheme which is substantially similar to that shown in FIG. 6.a. To avoid repetitions, reference is made to the above description in conjunction with FIG. 6.a. However, the lining 50 has a 2-part structure in this case, being composed of lateral wall 52 as a first part of lining 50 and bottom 53 as a second part of lining 50. The bottom 53 extends beyond the abutting edge with lateral wall 52. Bottom projects at the side, so to speak. Thereby, a kind of extension or collar is formed. The two lower connections 62 and 63 engage at this extension. This configuration permits easy connectability to lower connecting member 65, not shown here (see FIG. 4.d).

FIG. 6.f shows a power feeding scheme which substantially corresponds to that shown in FIG. 6.b. In addition to the inclination of walls 52, another difference of this configuration is that it does not have a collar at the inlet 3a.

FIG. 6.g shows a power feeding scheme in a refining crucible 3 having an inlet 3a in the base surface 33. By way of example, the polarities of the power supply and thus the direction of current flow in the lining 50 have been reversed.

Further, FIG. 6.h shows a power feeding scheme in which connections 60 to 63 are arranged at lateral wall 52 in a manner to be not placed at the edge nor in the corner but in a range therebetween. Upper connections 60 and 61 and lower connections 62 and 63 are disposed on lateral wall 52. Therefore, lateral wall 52 is conductively heated only in sections thereof.

FIG. 6.i shows an embodiment in which the bottom does no longer have a planar shape but is curved. In this embodiment as well, the refining volume may have associated therewith a base surface 33 which is curved in this case.

FIG. 6.j, by contrast, shows an embodiment with a substantially triangular cross-section. Here, the base 33 is formed by the lower point of the triangle. Moreover, lower connections 62 and 63 coincide in a point or in a small area.

FIG. 6.k shows an embodiment with a completely curved configuration. As a further development, FIG. 6.l shows a modification which is formed by two curved surfaces in this case.

FIGS. 6.m and 6.n show embodiments in which the electric current, in sections, runs perpendicular to or even against the actual direction of current flow. Important herein is the fact that in a sort of overall consideration the current still runs from bottom to top.

Finally FIG. 6.o shows an embodiment in which the lining 50 extends so far down at the outer surface, that the upper connections 60 and 61 are below the lower connections 62 and 63, when spatially considered. However, it is essential that the current is still supplied to the lining 50 in such a way that the direction of current flow within the lining 52 of lateral wall 10 extends from top to bottom.

In all embodiments shown, the electric potential difference in lateral wall 52 is selected such that the direction of current flow in lateral wall 52 is from the top surface 31 to the base surface 33 (FIGS. 6.a to 6.f, and 6.h to 6.o), or vice versa, from the base surface 33 to the top surface 31 (FIG. 6.g). So the current flows from the upper side to the lower side or vice versa. It can thus be seen that the current will not flow such that the direction of current flow in the lateral wall 52 which is in contact with the melt 1 is reversed or completely reversed so that for example the current flow in one lateral wall 52 would be from the top surface 31 to the base surface 33 and in an opposite lateral wall 52 from the base surface 33 to the top surface 31.

FIG. 7 shows a schematic view of the detail Z1 of FIG. 4.a. In lateral wall 52 gas supply lines 90 are arranged or incorporated. In this manner, a defined atmosphere may be applied at the rear side or the side of lining 50 or 53 that faces away from the melt. Preferably, an atmosphere of a non-oxidizing fluid is applied. Preferably, the fluid is provided as a gas. The gas is at least one gas selected from a group consisting of nitrogen, an inert gas, and hydrogen.

This enables an effective protection against oxidation for the lining 50 or 53, in particular for a lining 50 or 53 made of iridium, since iridium is not resistant to oxidation at high temperatures, in particular with respect to the ambient oxygen. A completely gas-tight structure which is generally complicated to implement is not required. Preferably, the defined atmosphere does not constitute a flowing system but rather a substantially static system without permanent fluid exchange. In this manner, a vaporization of the metallic lining 50 at high temperatures can be reduced, since a thermodynamic equilibrium will be reached between the solid and the gaseous or liquid phases.

FIGS. 8.*a* and 8.*b* illustrate a view of the detail Z2 of FIG. 4*a*, with a first and a second exemplary implementation of the transition area in which connections to the lining 50 or 51 are established on the one hand, and in which the transition to adjacent devices 4 or to the upper furnace 40 is accomplished.

The transition area is designed as a so-called glazing collar 80.

FIG. 8.*a* shows a first embodiment of glazing collar 80 according to the invention. The collar 51 of lining 50 extends beyond the outer edge of lateral wall 10, "bends" downward and engages connecting member 67 or the flange for heating the lining 50. In this manner, a electrical connection is established. Preferably, lining 50 or the end of lining 51 resiliently engages connecting member 67, so that thermal linear expansion can be compensated for. To this end, preferably, the end edge of lining 50 is "bent". Between the lining 50, the head end of connecting member 67 and a refractory material 42 which is covered by a Pt sheet 44, for example, an intermediate space is formed which can be filled with the melt 1. Connecting member 67 has an L-shape. Below the upper horizontal leg thereof, a cooling means 81 is arranged, for example a water-carrying pipe. This permits the melt 1 that flows into the intermediate space to freeze to form a protective jacket of intrinsic material and to close the transition area, preferably gas-tightly.

FIG. 8.*b* shows a second embodiment of the glazing collar 80 according to the invention. The area of the lining 50 and collar 51 which extend along the outer surface of lateral wall 10 is similar to the area described with reference to FIG. 8.*a*. To avoid repetitions, reference is therefore made to the description of FIG. 8.*a* above. Now, the connecting member 67 extends beyond the end or edge of lining 50 upwards. Connecting member 67 has a kind of extension or elongation which sits on the L-shape. Preferably, the extension extends up to the upper edge of lateral wall 10. Thus, an intermediate space is formed between lining 50 and connecting member 67, which can be filled with the melt 1. In or at the extension of connecting member 67, a cooling system or a cooling means 81 is arranged. Again, one possible implementation of cooling means 81 is a water-carrying pipe system 81. In this way, the melt 1 flowing into the intermediate space may freeze to form a protective jacket of intrinsic material and to close the transition area, preferably gas-tightly.

One advantage of the invention is for example that of an energy consumption lower by 60 to 80% as compared to the prior art device (see DE 10 2006 003 521 A1). Moreover, no additional failsafe cooling tower is required. Finally, the technology is not dependent on the electrical conductivity of the employed glasses. This offers high flexibility. For example, no modification is required when changing from borosilicate glass to glass-ceramic or to alkali-free glasses.

It will be apparent to those skilled in the art that the described embodiments are to be understood as examples. The invention is not limited to these exemplary embodiments but may be varied in many ways without departing from the spirit of the invention.

The features of individual embodiments as well as the features mentioned in the general part of the description may be combined with each other.

LIST OF REFERENCE NUMERALS

1 Melt or glass melt
1*a* Melt surface or free melt surface
1*b* Flow direction of melt
2 Melting trough or melting unit
3 Refining crucible or refining zone
3*a* Inlet of refining crucible
3*b* Outlet of refining crucible
3*c* Upper side of refining crucible
3*d* Lower side of refining crucible
4 Channel or conditioning means
5 Homogenizing means
5*a* Agitator means
6 Shaping means
10 Lateral walls or circumferential surface
10*a* Upper surface of lateral wall
10*b* Inner surface of lateral wall
10*c* Outer surface of lateral wall
11 First layer
12 Second layer
13 Third layer
23 Bottom or foundation of refining crucible
24 Bin or gas-tight bin
31 Top surface
32 Circumferential surface
33 Base surface
40 Upper furnace
41 Burner
42 Lateral wall of upper furnace
43 Ceiling of upper furnace
44 Sheet metal or platinum sheet
50 Lining
51 Collar of lining
52 Lateral wall of lining
53 Bottom of lining
60 First upper connection
61 Second upper connection
62 First lower connection
63 Second lower connection
64 Extension element or extension plate
65 Lower connecting member, especially for bottom, or flange or nickel flange
66 Lower coupling means between lower connecting member and a heating means
67 Upper connecting member for lateral wall and/or collar or flange or nickel flange
68 Upper coupling means between upper connecting member and a heating means
69 Insulation between the two coupling means
71 First heating means or first transformer
72 Second heating means or second transformer
73 Induction coil
80 Glazing collar
81 Cooling means or fluid-carrying pipe or pipe system
90 Gas supply

The invention claimed is:

1. A device for refining an inorganic non-metallic melt, comprising:
  a refining crucible with an upper side, a lower side and lateral walls, the lateral walls having a metallic lining as a melt contact surface on an inner surface thereof, the lateral walls include at least a first layer and a second layer, the first layer providing stability to the refining crucible, the second layer providing thermal insulation to the refining crucible, the first layer having a higher temperature stability as compared to the second layer, the first layer being adjacent to the metallic lining, the second layer having a lower thermal conductivity as compared to the first layer, and wherein the metallic lining completely provides the melt contact surface of the refining crucible;

at least one heating device that conductively heats the metallic lining by an electric current in the metallic lining so that the melt is heated by the metallic lining, wherein the heating device and the metallic lining are connected to one another via a feed device, wherein the feed device establishes contact with the metallic lining by at least one upper connection and at least one lower connection so that, at least in sections of the metallic lining, an electric current passes between an upper side and a lower side, and wherein the refining crucible and the metallic lining are not actively cooled.

2. The device as claimed in claim 1, wherein the electric current runs from the upper side to the lower side.

3. The device as claimed in claim 1, wherein the electric current runs from the lower side to the upper side.

4. The device as claimed in claim 1, wherein the metallic lining forms a collar that covers an upper surface of the lateral walls, at least in sections thereof.

5. The device as claimed in claim 4, wherein the upper connection is associated with one or more of the lateral walls and the collar, and the lower connection is associated with one or more of the lower side and a bottom of the refining crucible.

6. The device as claimed in claim 5, wherein the upper connection is formed as a jacket that extends around a circumference of the lateral walls.

7. The device as claimed in claim 5, wherein the lower connection is formed as a plate that extends around a circumference of at least one of the lower side and a bottom of the refining crucible.

8. The device as claimed in claim 1, wherein the feed device comprises an upper coupling device and a lower coupling device electrically connecting the metallic lining with the heating device.

9. The device as claimed in claim 8, wherein the upper and lower coupling devices each extend around a circumference of the refining crucible.

10. The device as claimed in claim 1, wherein the feed device has an enlarged cross-section as compared to the metallic lining.

11. The device as claimed in claim 1, further comprising at least one cooling device associated with the feed device.

12. The device as claimed in claim 1, further comprising an inductive heating device inductively heating the metallic lining.

13. The device as claimed in claim 1, wherein the lateral walls are inclined relative to one or more of the lower side and a bottom of the refining crucible.

14. The device as claimed in claim 1, wherein the lateral walls have a multi-layered structure.

15. The device as claimed in claim 1, wherein the lateral walls further comprise a third layer arranged between the first layer and the metallic lining.

16. The device as claimed in claim 15, wherein the third layer comprises a fabric.

17. The device as claimed in claim 1, wherein the first layer has a substantially L-shaped cross-section and wherein one leg thereof extends outwards above the second layer.

18. The device as claimed in claim 1, further comprising one or more gas supply lines that extend through the lateral walls so that a defined atmosphere is providable at a side of the metallic lining facing away from the melt.

19. The device as claimed in claim 1, wherein the heating device supplies the electric current at a frequency from 10 Hz to 10 kHz.

20. A method for producing a glass and/or a glass-ceramic, comprising:
    melting a batch to provide a glass melt; and
    refining the glass melt by increasing a temperature of at least a part of the glass melt adjacent to a lateral wall by conductively heating via an electric current to a metallic lining of the lateral wall that completely provides a melt contact surface with the glass melt, the lateral walls including at least a first layer adjacent to the metallic lining and a second layer, the first layer having a higher temperature stability as compared to the second layer, the second layer having a lower thermal conductivity as compared to the first layer, wherein an electric potential difference is provided in the lateral wall so that a direction of current flow in the lateral wall is between a top and a bottom
    wherein the refining step comprises not actively cooling the lateral wall.

21. The method as claimed in claim 20, wherein the direction of current flow in the lateral wall is from the top to the bottom.

22. The method as claimed in claim 20, wherein the direction of current flow in the lateral wall is from the bottom to the top.

23. The method as claimed in claim 20, further comprising exposing the refined glass melt to a process selected from the group consisting of: homogenizing the refined glass melt, conditioning the refined glass melt, shaping the refined glass melt, cooling the refined glass melt, heat treating the refined glass melt, and any combinations thereof.

24. A device for refining an inorganic non-metallic melt, comprising:
    a refining crucible with an upper side, a lower side and lateral walls, the lateral walls having a metallic lining as a melt contact surface on an inner surface thereof, the lateral walls include at least a first layer and a second layer, and wherein the metallic lining completely provides the melt contact surface of the refining crucible, the first layer providing stability to the refining crucible, the second layer providing thermal insulation to the refining crucible, the first layer having a higher temperature stability as compared to the second layer, the first layer being adjacent to the metallic lining, and the second layer having a lower thermal conductivity as compared to the first layer;
    at least one heating device that conductively heats the metallic lining by an electric current in the metallic lining so that the melt is heated by electric resistance heating of the metallic lining, wherein the heating device and the metallic lining are connected to one another via a feed device,
    wherein the feed device establishes contact with the metallic lining by at least one upper connection and at least one lower connection so that, at least in sections of the metallic lining, an electric current passes between an upper side and a lower side.

25. A method for producing a glass and/or a glass-ceramic, comprising:

melting a batch to provide a glass melt; and refining the glass melt by increasing a temperature of at least a part of the glass melt adjacent to a lateral wall by conductively heating via electric resistance heating by passing an electric current in a metallic lining of the lateral wall, the lateral wall having a first layer adjacent the metallic lining and a second layer, the first layer having a higher temperature stability as compared to the second layer, the second layer having a lower thermal conductivity as compared to the first layer, and the metallic lining completely providing a melt contact surface with the glass melt, wherein an electric potential difference is provided in the metallic lining of the lateral wall so that a direction of current flow in the metallic lining of the lateral wall is between a top and a bottom.

26. The method as claimed in claim 25, wherein the direction of current flow in the metallic lining of the lateral wall is from the top to the bottom.

27. The method as claimed in claim 25, wherein the direction of current flow in the metallic lining of the lateral wall is from the bottom to the top.

* * * * *